(12) United States Patent
Van Lieshout et al.

(10) Patent No.: US 10,111,150 B2
(45) Date of Patent: Oct. 23, 2018

(54) MOBILE TERMINAL HANDOVER IN AN LTE NETWORK

(71) Applicant: Samsung Electronics Co., Ltd., Gyeonggi-do (KR)

(72) Inventors: Gert Jan Van Lieshout, Middlesex (GB); Himke Van Der Velde, Middlesex (GB)

(73) Assignee: Samsung Electronics Co., Ltd., Suwon-Si (KR)

( * ) Notice: Subject to any disclaimer, the term of this patent is extended or adjusted under 35 U.S.C. 154(b) by 116 days.

(21) Appl. No.: 14/768,205

(22) PCT Filed: Jan. 21, 2014

(86) PCT No.: PCT/KR2014/000583
§ 371 (c)(1),
(2) Date: Aug. 14, 2015

(87) PCT Pub. No.: WO2014/126345
PCT Pub. Date: Aug. 21, 2014

(65) Prior Publication Data
US 2016/0037425 A1 Feb. 4, 2016

(30) Foreign Application Priority Data
Feb. 15, 2013 (GB) .................................. 1302687.7

(51) Int. Cl.
*H04W 36/30* (2009.01)
*H04W 36/08* (2009.01)
(Continued)

(52) U.S. Cl.
CPC ............ *H04W 36/30* (2013.01); *H04B 7/024* (2013.01); *H04W 36/0088* (2013.01); *H04W 36/08* (2013.01); *H04W 88/085* (2013.01)

(58) Field of Classification Search
None
See application file for complete search history.

(56) References Cited

U.S. PATENT DOCUMENTS 9,319,949 B2   4/2016  Tanaka
2012/0201163 A1  8/2012  Jongren et al.
(Continued)

FOREIGN PATENT DOCUMENTS

EP    2 343 947 A1    7/2011
WO   WO 2012/020457 A1  2/2012
(Continued)

OTHER PUBLICATIONS

International Search Report dated May 28, 2014 in connection with International Patent Application No. PCT/KR2014/000583, 3 pages.
(Continued)

*Primary Examiner* — Lonnie V Sweet

(57) ABSTRACT

A method of handing over a mobile terminal from a source base station to a target base station in a Long Term Evolution, LTE, compliant mobile wireless communications network. The method comprises generating a measurement report including one or more channel state information reference signal, CSI-RS, measurement result at a mobile terminal. The mobile terminal sends the measurement report to a source base station. The source base station determines either in response to the measurement report or separately that the network should handover the mobile terminal to a target base station. The source base station sends a handover request to the target base station. The handover request sent from the source base station to the target base station includes at least one CSI-RS measurement result received from the mobile terminal such that the target base station can initiate coordinated multi-point transmission, CoMP, to the mobile terminal upon handover.

20 Claims, 6 Drawing Sheets

(51) Int. Cl.
*H04W 36/00* (2009.01)
*H04W 88/08* (2009.01)
*H04B 7/024* (2017.01)

(56) References Cited

U.S. PATENT DOCUMENTS

| | | |
|---|---|---|
| 2012/0207105 A1 | 8/2012 | Geirhofer et al. |
| 2013/0021929 A1 | 1/2013 | Kim |
| 2013/0039199 A1 | 2/2013 | Liao et al. |
| 2013/0165122 A1* | 6/2013 | Tanaka .................. H04B 7/024 455/436 |
| 2013/0196699 A1* | 8/2013 | Davydov ................ H04W 4/70 455/500 |
| 2013/0242902 A1* | 9/2013 | Liu ....................... H04W 24/10 370/329 |
| 2013/0272132 A1* | 10/2013 | Heo ...................... H04W 28/02 370/236.2 |
| 2013/0288672 A1* | 10/2013 | He ................... H04W 72/0406 455/434 |
| 2013/0301439 A1* | 11/2013 | Heo .................... H04W 76/048 370/252 |
| 2013/0343317 A1* | 12/2013 | Etemad ................. H04B 7/024 370/329 |
| 2015/0036658 A1* | 2/2015 | Mochizuki ............ H04W 24/10 370/331 |
| 2016/0021581 A1* | 1/2016 | Deenoo ................. H04W 48/16 370/331 |

FOREIGN PATENT DOCUMENTS

| | | |
|---|---|---|
| WO | WO 2012/092799 A1 | 7/2012 |
| WO | WO 2012/103781 A1 | 8/2012 |
| WO | WO 2012/139456 A1 | 10/2012 |
| WO | WO 2012/167502 A1 | 12/2012 |
| WO | WO 2013/015392 A1 | 1/2013 |
| WO | WO 2013/020520 A1 | 2/2013 |
| WO | WO 2013/048121 A1 | 4/2013 |

OTHER PUBLICATIONS

Written Opinion of the International Searching Authority dated May 28, 2014 in connection with International Patent Application No. PCT/KR2014/000583, 5 pages.
Search Report dated Aug. 7, 2013 in connection with United Kingdom Patent Application No. GB1302687.7.
Search Report dated Apr. 17, 2013 in connection with United Kingdom Patent Application No. GB1220427.7.

* cited by examiner

[Fig. 1]
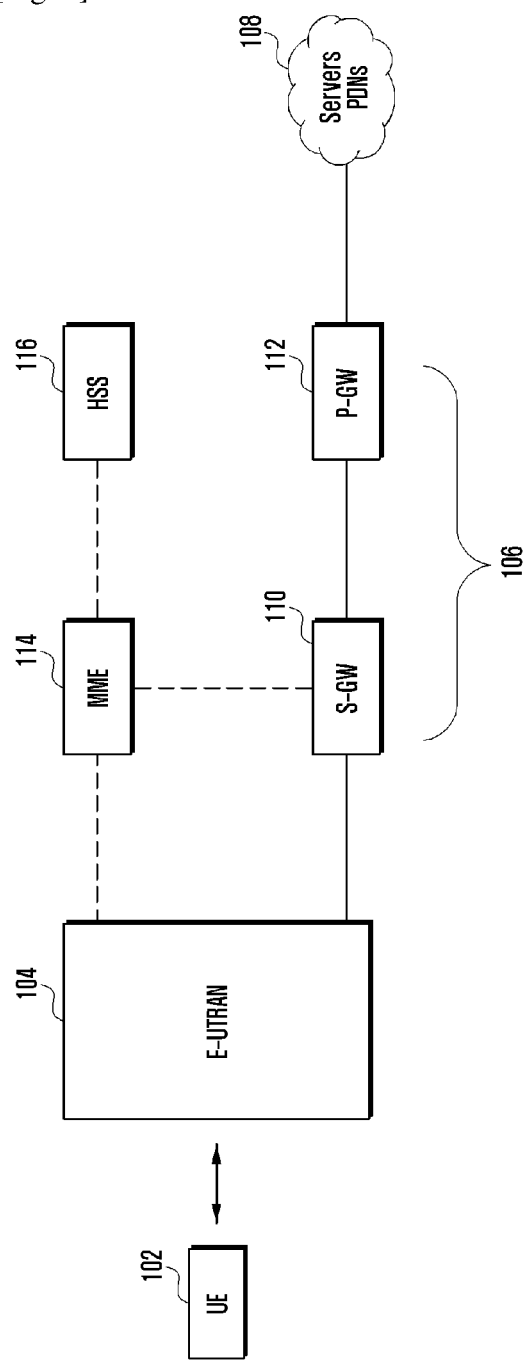

[Fig. 2]
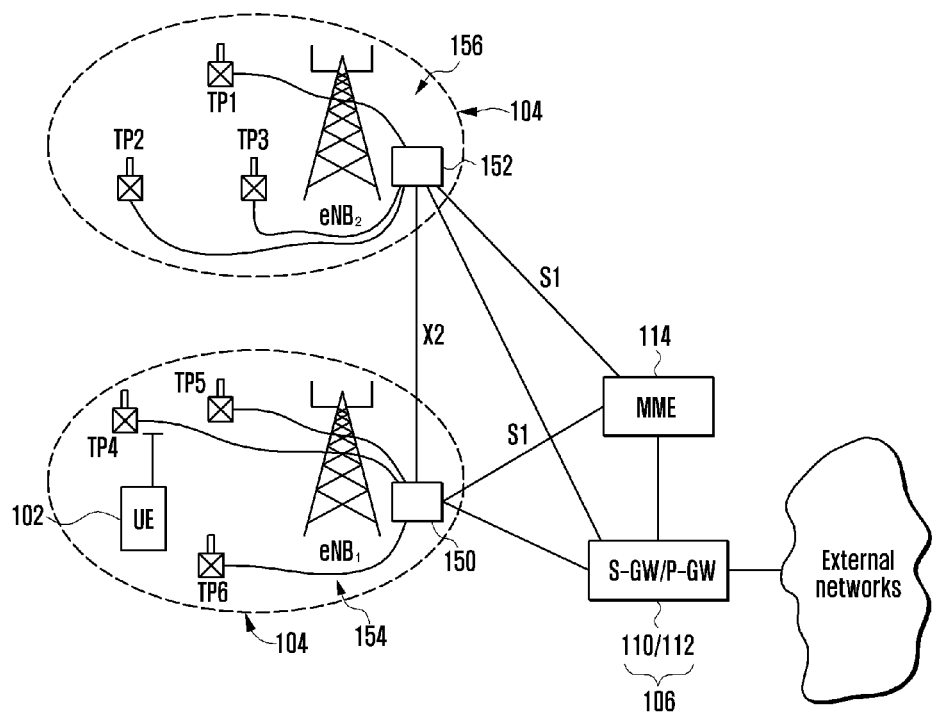
[Fig. 3]
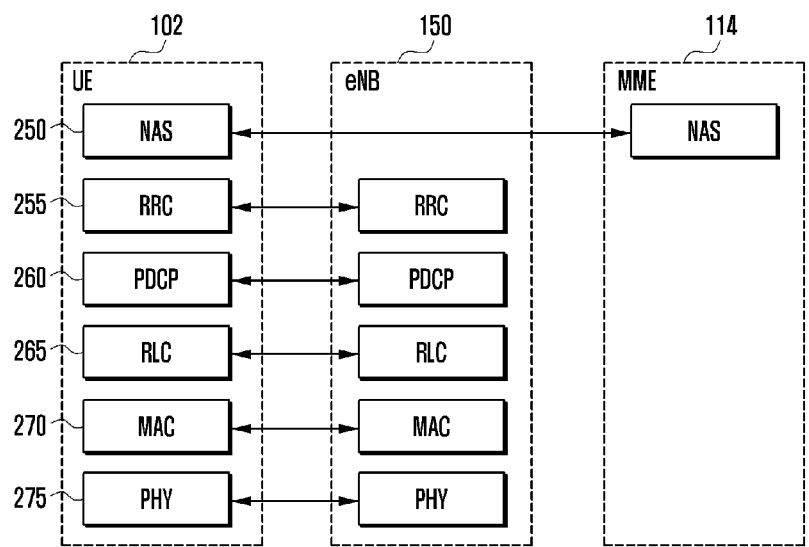

[Fig. 4]
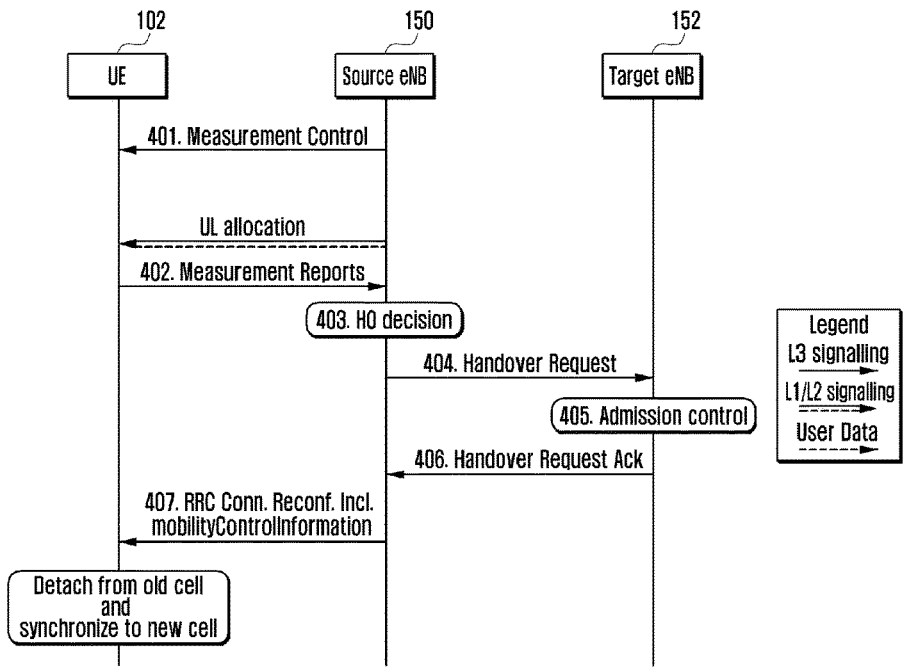
[Fig. 5]
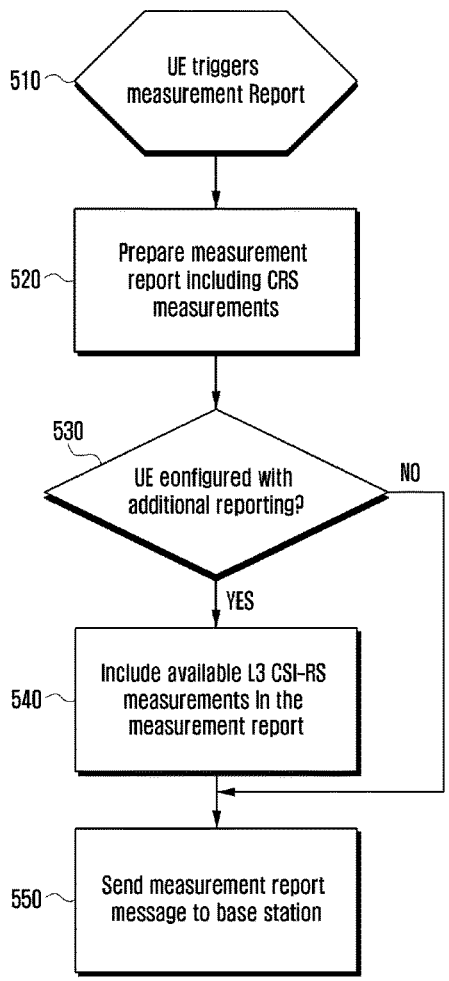

[Fig. 6]
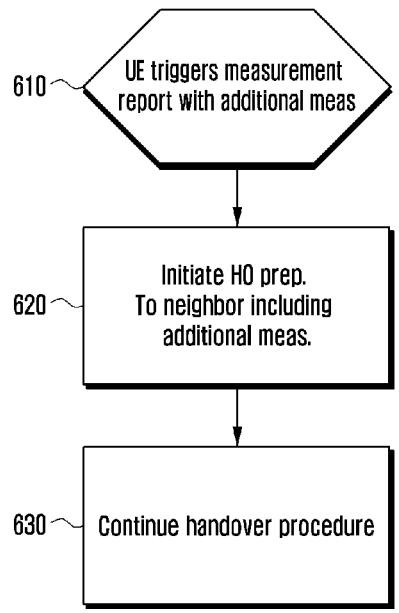
[Fig. 7]
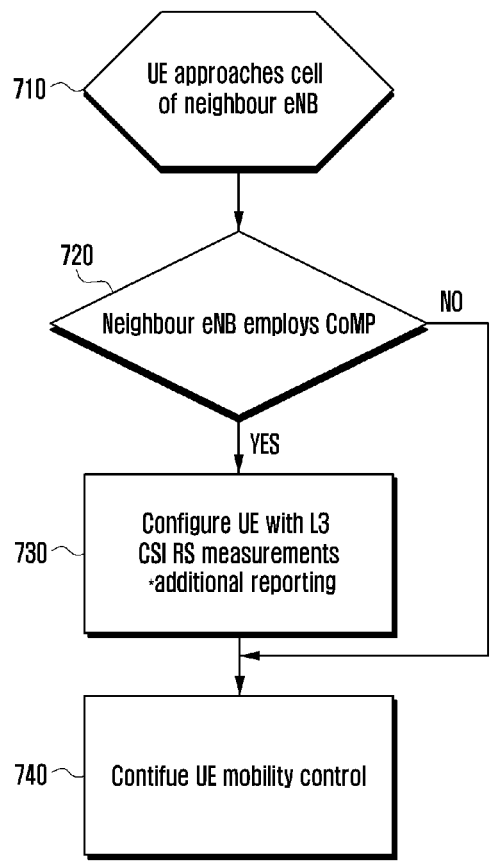

[Fig. 8]
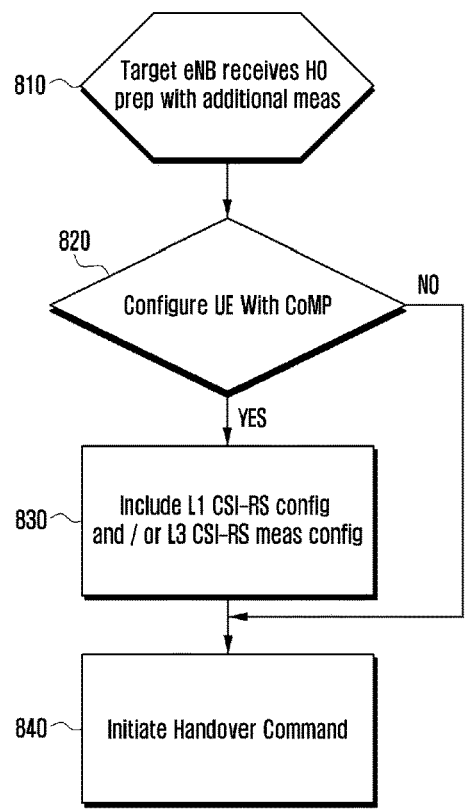
[Fig. 9]
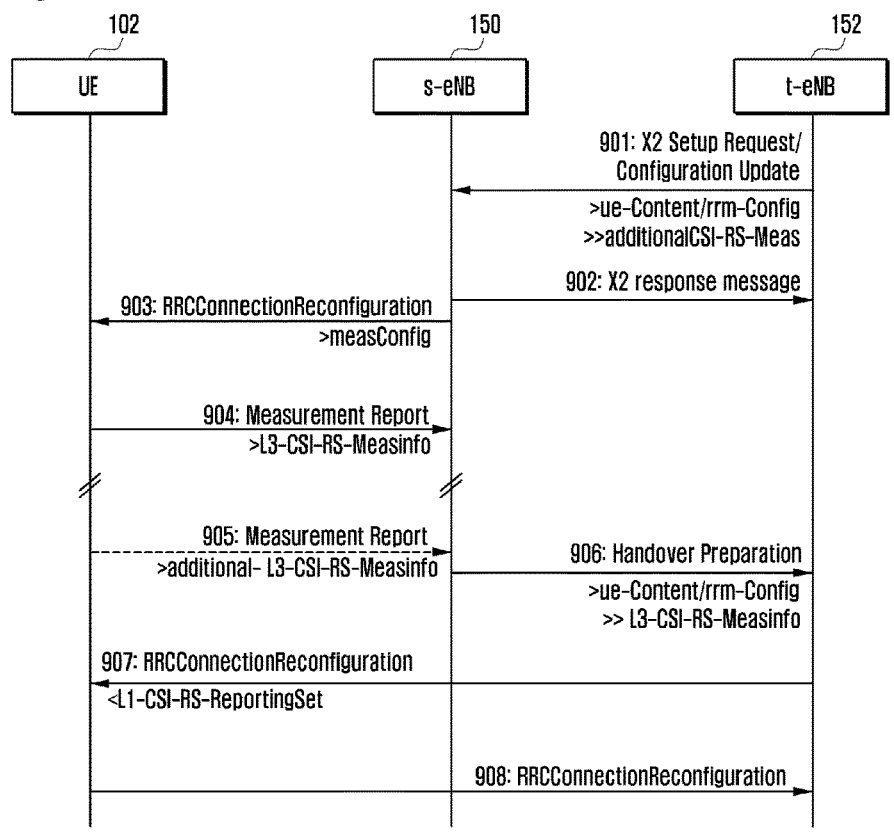

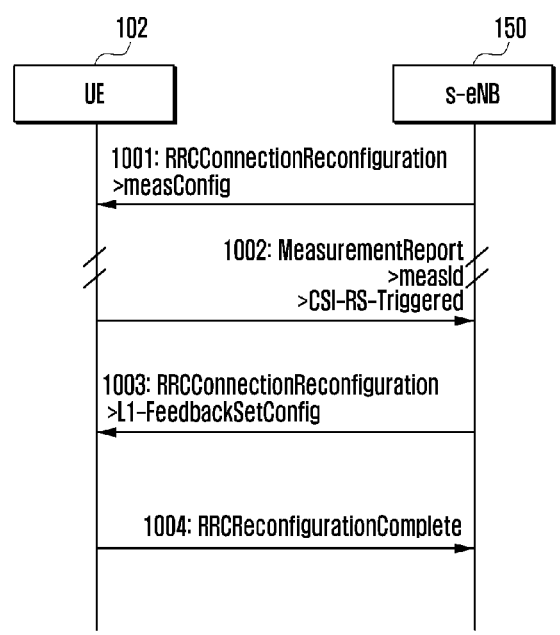
[Fig. 10]

MOBILE TERMINAL HANDOVER IN AN LTE NETWORK

CROSS-REFERENCE TO RELATED APPLICATION(S)

The present application claims priority under 35 U.S.C. § 365 to International Patent Application No. PCT/KR2014/000583 filed Jan. 21, 2014, entitled "MOBILE TERMINAL HANDOVER IN AN LTE NETWORK" and, through International Patent Application No. PCT/KR2014/000583 to British Patent Application No. 1302687.7 filed Feb. 15, 2013, each of which are incorporated herein by reference into the present disclosure as if fully set forth herein.

TECHNICAL FIELD

The present invention relates to handover of a mobile terminal between base stations in a Long Term Evolution (LTE) compliant mobile communications network. In particular, the present invention relates to handover in a network which implements Coordinated Multi-Point transmission (CoMP). Embodiments of the present invention may be implemented in a 3rd Generation Partnership Project (3GPP) LTE or LTE Advanced compliant mobile communications network comprising a mobile terminal (also referred to herein as User Equipment, UE) and network equipment, and in particular a base station (also referred to herein as an evolved Node B, eNB). Certain embodiments of the present invention also relate to the making and reporting of network measurements by mobile terminals in the network and the transmission of measurement results between base stations at the time of handover. Certain embodiments of the present invention also relate to methods of operating mobile terminals in LTE networks to generate and transmit measurement reports when in an RRC-CONNECTED state. The measurement reports may include measurement results mandatory according to the respective 3GPP standards, or in accordance with a report trigger criterion, and additionally reported measurement results (measurement results which would not normally be, or previously have been included in the measurement report). Specifically, additionally reported measurement results are results that are not in response to a trigger criterion. According to certain embodiments of the present invention the UE may log measurement results in response to a network failure and/or when the UE is in an RRC-IDLE state. The availability of these measurement results may be indicated to the network for later retrieval.

BACKGROUND ART

Wireless or mobile communications networks in which a mobile terminal (UE, such as a mobile handset) communicates via a radio link to a network of base stations (eNBs) or other wireless access points connected to a telecommunications network, have undergone rapid development through a number of generations. The initial deployment of systems using analogue signalling has been superseded by second generation (2G) digital systems such as Global System for Mobile communications (GSM), which typically use a radio access technology known as GSM Enhanced Data rates for GSM Evolution Radio Access (GERA), combined with an improved core network.

Second generation systems have themselves been replaced by or augmented by third generation (3G) digital systems such as the Universal Mobile Telecommunications System (UMTS), which uses a Universal Terrestrial Radio Access Network (UTRAN) radio access technology and a similar core network to GSM. UMTS is specified in standards produced by 3GPP. Third generation standards provide for a greater throughput of data than is provided by second generation systems. This trend is continued with the move towards fourth generation (4G) systems.

3GPP design, specify and standardise technologies for mobile (cellular) wireless communications networks. Specifically 3GPP produces a series of technical reports (TR) and technical specifications (TS) that define 3GPP technologies. The focus of 3GPP is currently the specification of standards beyond 3G, and in particular an Evolved Packet System (EPS) offering enhancements over 3G networks, including higher data rates. The set of specifications for the EPS comprises two work items: Systems Architecture Evolution (SAE, concerning the core network) and LTE concerning the air interface. The first set of EPS specifications were released as 3GPP Release 8 in December 2008. LTE uses an improved radio access technology known as Evolved UTRAN (E-UTRAN), which offers potentially greater capacity and additional features compared with previous standards. SAE provides an improved core network technology referred to as the Evolved Packet Core (EPC). Despite LTE strictly referring only to the air interface, LTE is commonly used to refer to the whole of the EPS, including by 3GPP themselves. LTE is used in this sense in the remainder of this specification, including when referring to LTE enhancements, such as LTE Advanced. LTE is an evolution of the UMTS and shares certain high level components and protocols with UMTS. LTE Advanced offers still higher data rates compared to LTE and is defined by 3GPP standards releases up to and including 3GPP Release 12. LTE Advanced is considered to be a 4G mobile communication system by the International Telecommunication Union (ITU).

Embodiments of the present invention are implemented within an LTE mobile network. Therefore, an overview of an LTE network is shown in FIG. 1. The LTE system comprises three high level components: at least one UE 102, the E-UTRAN 104 and the EPC 106. The EPC 106 communicates with Packet Data Networks (PDNs) and servers 108 in the outside world. FIG. 1 shows the key component parts of the EPC 106. It will be appreciated that FIG. 1 is a simplification and a typical implementation of LTE will include further components. In FIG. 1 interfaces between different parts of the LTE system are shown. The double ended arrow indicates the air interface between the UE 102 and the E-UTRAN 104. For the remaining interfaces media is represented by solid lines and signalling is represented by dashed lines.

The E-UTRAN 104 comprises a single type of component: an eNB which is responsible for handling radio communications between the UE 102 and the EPC 106 across the air interface. An eNB controls UEs 102 in one or more cell. A cell may refer to the area of reception defined by a single antenna. However, where an eNB implements downlink CoMP there may be multiple transmission points used within a cell. From the perspective of the UE in some deployment scenarios the transmissions may be seen as resulting from a single cell. LTE is a cellular system in which the eNBs provide coverage over one or more cells. Typically there is a plurality of eNBs within an LTE system. In general, a UE in LTE communicates with one eNB through one cell at a time. From 3GPP Release 10 an eNB may configure the UE with multiple serving cells, one on each serving frequency, which is known as Carrier Aggregation. The eNB itself typically includes a tower with one or more antennas for transmitting and receiving wireless signals to and from a UE.

Key components of the EPC 106 are shown in FIG. 1. It will be appreciated that in an LTE network there may be more than one of each component according to the number of UEs 102, the geographical area of the network and the volume of data to be transported across the network. Data traffic is passed between each eNB and a corresponding Serving Gateway (S-GW) 110 which routes data between the eNB and a PDN Gateway (P-GW) 112. The P-GW 112 is responsible for connecting a UE to one or more servers or PDNs 108 in the outside world. The Mobility Management Entity (MME) 114 controls the high-level operation of the UE 102 through signalling messages exchanged with the UE 102 through the E-UTRAN 104. Each UE is registered with a single MME. There is no direct signalling pathway between the MME 114 and the UE 102 (communication with the UE 102 being across the air interface via the E-UTRAN 104). Signalling messages between the MME 114 and the UE 102 comprise EPS Session Management (ESM) protocol messages controlling the flow of data from the UE to the outside world and EPS Mobility Management (EMM) protocol messages controlling the rerouting of signalling and data flows when the UE 102 moves between eNBs within the E-UTRAN. The MME 114 exchanges signalling traffic with the S-GW 110 to assist with routing data traffic. The MME 114 also communicates with a Home Subscriber Server (HSS) 116 which stores information about users registered with the network.

The UE can exist in one of two communication states in LTE: an idle state (Radio Resource Control Idle, RRC-IDLE) in which the UE is basically on standby, and a connected state (RRC-CONNECTED) in which the UE has an active radio link to the eNB.

In the RRC-IDLE state in LTE, the UE is tracked by the network to a specific tracking area, which may cover several eNBs. The UE is not aware of the network topology. Rather the UE is only aware of logical entities (for instance cells and tracking areas) but does not know which cell is connected to which eNB. The UE may choose which cell to listen to. The main aim in this state is to minimise signalling and resources, and thereby maximise standby time for terminals with limited battery power.

In contrast, in the RRC-CONNECTED state in LTE, the UE has a serving eNB allocated to it, has its location tracked to the serving eNB, and has active bearers which allow the terminal to transmit and receive at relatively high data rates and the network chooses the cell(s) by which it serves the UE.

In a recent development of LTE known as coordinated multi-point transmission (CoMP), the eNB is able to configure multiple Transmission Points (TPs) per serving frequency which are geographically remote from each other. Each transmission point may consist of a set of geographically co-located transmit antennas. For downlink in CoMP, the E-UTRAN coordinates the signals transmitted from the different TPs to increase signal strength or to reduce co-channel interference as perceived by the UE. The transmissions from the multiple TPs may be perceived by the UE as resulting from a single cell.

Physical signals are used in LTE for both uplink and downlink in order to support physical layer operations such as channel estimation, scheduling, and synchronisation. One subset of the physical signals is reference signals, which are used, among other things, to enable feedback from the UE on various channels used by the E-UTRAN. For example, Cell-specific Reference Symbols (CRS) can be used by a UE to provide estimates of phase and amplitude of transmissions from different antennas of an eNB. These estimates are fed back to the eNB in real-time for optimisation of transmissions. CRSs are also measured by the UE in order to establish power and quality indicators for the channel. These measurement results (indicators) can be reported back in a measurement report to the network for mobility management and network optimisation.

In CoMP, the transmission points (TPs) can be monitored and measured using a different set of reference signals known as Channel State Information Reference Signals (CSI-RS). Each configuration of a channel state indicator reference signal (CSI-RS) is known as a CSI-RS resource configuration. Although it is possible to configure a CSI-RS resource configuration per transmission point, the LTE standards also allow the eNB to configure a single CSI-RS resource configuration for multiple transmission points.

DISCLOSURE OF INVENTION

Technical Problem

CSI-RS measurement results are generated by the UE and sent to the eNB in a measurement report. The eNB uses this information to configure the transmission points to be used in CoMP. However, when handover of a UE from a cell controlled by a source eNB to a cell controlled by a target eNB occurs the target eNB cannot immediately initiate CoMP until it has received a set of CSI-RS measurement results from the UE. The effect is that the effectiveness of the radio link between the UE and the LTE network is reduced after handover until CoMP can be reinitiated. This may result in a reduce data transfer rate in the downlink to the UE after handover, which may be perceptible to the user.

Measurement reports are either triggered, for instance by an event detected by the terminal or in response to a message from the eNB, or are periodic. Periodic measurement reports may be considered to be triggered, in the sense that they are triggered by the expiry of a periodic timer. Each measurement comprises a report configuration and a measurement object (a set of cells on a frequency). The report configuration defines amongst other things when a report is triggered, which can be periodic or upon an event, and a type of measurement, for instance identifying a type of measurement (for instance CRS or CSI-RS). Events are defined by conditions, for instance a measurement quantity (trigger quantity) is above a threshold. However, there may be situations in which the UE is in possession of pertinent measurement results that may be of value to the eNB, for instance when making a handover decision, though there is no available mechanism in the prior art for providing such results to the eNB.

Solution to Problem

It is an aim of embodiments of the present invention to obviate or mitigate one or more of the problems associated with the prior art, whether identified herein or elsewhere. In particular, it is an aim of certain embodiments of the present invention to provide improvements allowing the activation of CoMP in an LTE network immediately upon handover of a UE from a source eNB to a target eNB. Embodiments of the present invention particularly address signalling aspects concerning the immediate use of CoMP transmission to UEs upon cell and eNB change in RRC-CONNECTED mode. Embodiments of the present invention primarily relate to 3GPP Release 11 of the LTE standards, but are applicable to other releases and other radio access systems.

According to a first aspect of the present invention there is provided a method of handing over a mobile terminal from a source base station to a target base station in a Long Term Evolution, LTE, compliant mobile wireless communications network, the method comprising: generating a measurement report including one or more channel state information reference signal, CSI-RS, measurement result at a mobile terminal; sending the measurement report from the mobile terminal to a source base station; determining at the source base station either in response to the measurement report or separately that the network should handover the mobile terminal to a target base station; and sending a handover request from the source base station to the target base station; wherein the handover request sent from the source base station to the target base station includes at least one CSI-RS measurement result received from the mobile terminal such that the target base station can initiate coordinated multi-point transmission, CoMP, to the mobile terminal upon handover.

Advantageously, the first aspect of the present invention allows CoMP to be initiated immediately upon handover as the target base station is provided with necessary CSI-RS measurement results as part of the handover process, and so can configure an appropriate set of transmission points (TPs) straightaway, without having to request and receive this measurement data from the mobile terminal.

Embodiments of the present invention relate to measuring and reporting within a mobile wireless communications network. In particular, embodiments of the invention may concern measuring a CSI-RS resource or a cell specific reference signal (CRS) resource at a mobile terminal within a network. The mobile terminal is arranged to generate a measurement report including a measurement result for a resource on a frequency indicated by a measurement object in response to a trigger condition for that resource indicated by a reporting configuration associated with the measurement object by a measurement identity.

Particular embodiments of the present invention concern the use of measurement results at a source base station to trigger a handover of a mobile terminal from the source base station to a target base station or the provision of the measurement results to the target base station at the time of handover. However, in a typical embodiment of the invention, the mobile terminal remains unaware of the purpose of a measurement event, measurement condition, reporting trigger or measurement report. The mobile terminal evaluates a condition and when the condition is met the mobile terminal triggers a report. It is not necessary for the mobile terminal to be aware that the report may be used to facilitate a handover. Indeed in other embodiments of the invention measurement results are sent to a base station in a measurement report for purposes other than for facilitating handover. In the following detailed description of the invention reference to handover related results or reports should be interpreted in the sense that while the results or reports may be relevant to handover, the mobile terminal may not necessarily have any awareness of their relevance to handover.

The method may further comprise: generating a measurement report at the mobile terminal in response to a trigger; and sending the measurement report from the mobile terminal to the source base station; wherein the generated measurement report includes: one or more cell specific reference symbols, CRS, measurement result or one or more CSI-RS measurement result indicated by a trigger criterion; and one or more additionally reported CSI-RS measurement result or one or more additionally reported CRS measurement result.

The measurement reports may include measurement results mandatory according to the respective 3GPP standards, or in accordance with a report trigger criterion, and additionally reported measurement results (measurement results which would not normally be, or previously have been included in the measurement report). Specifically, additionally reported measurement results are results that are not in response to a trigger criterion. For a mobile terminal in accordance with the prior art the type of measurement for which UE currently includes measurement results is determined by the associated reporting configuration linked to the measurement, while the frequency for which the mobile terminal currently includes measurement results is determined by the associated measurement object. Certain embodiments of the invention relate to additionally reporting different types of measurement results (different from the measurement type indicated by the trigger criterion) for the same frequencies (frequencies indicated by the associated measurement object) or the same (or different) types of measurement results for different frequencies (frequencies different from the frequency indicated by the associated measurement object). The additionally reported measurement results may alternatively be considered to be results not related to the purpose of the report.

In certain embodiments when additional reporting is configured the mobile terminal will only include additionally reported measurement results that are available to the mobile station. That is, the mobile station may additionally report available measurement results, but this does not necessarily imply that additional measurements are performed by the mobile station. The mobile station must be already configured to perform those measurements. As one example, when CSI-RS measurement results are to be additionally reported this may only occur if the mobile station is configured to perform such CSI-RS measurements. When the source base station has not activated downlink CoMP it may be that the measurement of CSI-RS resources would not normally be configured at the mobile terminal. In certain embodiments of the present invention the mobile terminal may be configured to additionally perform CSI-RS measurements that serve no current purpose while the mobile station is connected to the source base station, but are relevant to the target base station to allow the base station to activate CoMP immediately upon handover and so may be provided to the target base station by the source base station as described above.

The or each additionally reported measurement result may relate either to a different type of measurement result for a frequency for which the measurement report includes a measurement result indicated by a trigger criterion or to a measurement result for a frequency for which the measurement report does not include a measurement result indicated by a trigger criterion.

Generating a measurement report at a mobile terminal in response to a trigger may comprise at least one of: generating a measurement report including one or more CRS measurement result indicated by a trigger criterion and one or more additionally reported CSI-RS measurement result; generating a measurement report including one or more CSI-RS measurement result indicated by a trigger criterion and one or more additionally reported further CSI-RS measurement result; generating a measurement report including one or more CSI-RS measurement result indicated by a trigger criterion and one or more additionally reported CRS measurement result; or generating a measurement report including one or more CSI-RS measurement result indicated by a trigger criterion, one or more additionally reported further CSI-RS measurement result, and one or more additionally reported CRS measurement result.

The method may further comprise: sending a configuration message from the source base station to the mobile terminal indicating a set of measurement results to additionally report in measurement reports.

The configuration message may include: an indication whether the mobile terminal should include an additional reported measurement result within all measurement reports or for specified types of measurement reports; or an indication per measurement whether or not for measurement reports relating to that measurement the mobile terminal should include an additional reported measurement result.

The configuration message may indicate or further indicate that additionally reported measurement results relate to at least one of: a frequency indicated by an associated measurement object; a frequency which is not a frequency indicated by an associated measurement object; a predetermined list of frequencies; and all frequencies for which measurement results are available.

The configuration message may indicate or further indicate a predetermined maximum number of additionally reported measurement results, or a threshold that measurement results must exceed to be additionally reported.

The method may further comprise: sending a configuration message from the source base station to the mobile terminal indicating a set of CSI_RS resources to be reported or additionally reported and which are supplied to the source base station by the target base station.

Determining at the source base station that the mobile terminal should handover to a target base station may comprise: receiving a latest measurement report from the mobile terminal; determining whether the mobile should handover to the target base station on the basis of the latest measurement report; and wherein the handover request sent from the source base station to the target base station includes at least one CSI-RS measurement result received from the mobile terminal in the latest measurement report.

The handover request sent from the source base station to the target base station may include at least one CSI-RS measurement result received from the mobile terminal in a previous measurement report.

The handover request sent from the source base station to the target base station may include the at least one CSI-RS measurement result either within a mobile terminal context field or within an RRM configuration field.

According to a second aspect of the present invention there is provided a method of operating a mobile terminal in a Long Term Evolution, LTE, compliant mobile wireless communications network, the network further comprising a source base station and a target base station, the method comprising: generating a measurement report including one or more channel state information reference signal, CSI-RS, measurement result at the mobile terminal; sending the measurement report from the mobile terminal to a source base station such that the one or more CSI-RS measurement result can be included within a handover request sent from the source base station to a target base station such that the target base station can initiate coordinated multi-point transmission, CoMP, to the mobile terminal upon handover of the mobile terminal from the source base station to the target base station.

According to a third aspect of the present invention there is provided a method of operating a source base station in a Long Term Evolution, LTE, compliant mobile wireless communications network, the network further comprising a target base station and a mobile terminal, the method comprising: receiving a measurement report including one or more channel state information reference signal, CSI-RS, measurement result at the source base station from a mobile terminal; determining at the source base station either in response to the measurement report or separately that the network should handover the mobile terminal to a target base station; and sending a handover request from the source base station to the target base station; wherein the handover request sent from the source base station to the target base station includes at least one CSI-RS measurement result received from the mobile terminal such that the target base station can initiate coordinated multi-point transmission, CoMP, to the mobile terminal upon handover of the mobile terminal from the source base station to the target base station.

According to a fourth aspect of the present invention there is provided a method of operating a target base station in a Long Term Evolution, LTE, compliant mobile wireless communications network, the network further comprising a source base station and a mobile terminal, the method comprising: receiving a handover request from a source base station, the handover request including at least one CSI-RS measurement result received at the source base station from a mobile terminal; and initiating coordinated multi-point transmission, CoMP, to the mobile terminal upon handover of the mobile terminal to from the source base station to the target base station using the CSI-RS measurement result.

According to a fifth aspect of the present invention there is provided a Long Term Evolution, LTE, compliant mobile wireless communications network, the network comprising: a mobile terminal arranged to generate a measurement report including one or more channel state information reference signal, CSI-RS, measurement result; a source base station; and a target base station; wherein the mobile terminal is further arranged to send the measurement report from the mobile terminal to the source base station; wherein the source base station is arranged to determine that the network should handover the mobile terminal to the target base station either in response to the measurement report or separately, and to send a handover request from the source base station to the target base station; and wherein the handover request sent from the source base station to the target base station includes at least one CSI-RS measurement result received from the mobile terminal such that the target base station can initiate coordinated multi-point transmission, CoMP, to the mobile terminal upon handover of the mobile terminal from the source base station to the target base station.

According to a sixth aspect of the present invention there is provided a mobile terminal in a Long Term Evolution, LTE, compliant mobile wireless communications network, the network further comprising a source base station and a target base station, wherein: the mobile terminal is arranged to generate a measurement report including one or more channel state information reference signal, CSI-RS, measurement result; and the mobile terminal is arranged to send the measurement report to a source base station such that the one or more CSI-RS measurement result can be included within a handover request sent from the source base station to a target base station such that the target base station can initiate coordinated multi-point transmission, CoMP, to the mobile terminal upon handover of the mobile terminal from the source base station to the target base station.

According to a seventh aspect of the present invention there is provided a source base station in a Long Term Evolution, LTE, compliant mobile wireless communications network, the network further comprising a target base station and a mobile terminal, wherein the source base station is arranged to receive a measurement report including one or more channel state information reference signal, CSI-RS, measurement result from a mobile terminal; the source base station is arranged to determine either in response to the measurement report or separately that the network should handover the mobile terminal to a target base station; and the source base station is arranged to send a handover request from the source base station to the target base station; wherein the handover request sent from the source base station to the target base station includes at least one CSI-RS measurement result received from the mobile terminal such that the target base station can initiate coordinated multi-point transmission, CoMP, to the mobile terminal upon handover of the mobile terminal from the source base station to the target base station.

According to an eighth aspect of the present invention there is provided a target base station in a Long Term Evolution, LTE, compliant mobile wireless communications network, the network further comprising a source base station and a mobile terminal, wherein: the target base station is arranged to receive a handover request from a source base station, the handover request including at least one CSI-RS measurement result received at the source base station from a mobile terminal; and the target base station is arranged to initiate coordinated multi-point transmission, CoMP, to the mobile terminal upon handover of the mobile terminal to from the source base station to the target base station using the CSI-RS measurement result.

According to a ninth aspect of the present invention there is provided a method of operating a mobile terminal in a Long Term Evolution, LTE, compliant mobile wireless communications network, the method comprising: generating a measurement report at the mobile terminal in response to a trigger received from a base station; and sending the measurement report from the mobile terminal to the source base station; wherein the generated measurement report includes: one or more cell specific reference symbols, CRS, measurement result or one or more CSI-RS measurement result indicated by a trigger criterion; and one or more additionally reported CSI-RS measurement result or one or more additionally reported CRS measurement result.

Advantageously, the ninth aspect of the present invention provides additional measurement results to the base station in a timely manner, which would not otherwise be available to the base station. This information can then be used by the base station, for instance to form a handover decision on the basis of alternative measurement results, or to provide CSI-RS measurement results to a target base station during handover.

According to a tenth aspect of the present invention there is provided a method of operating a mobile terminal in a Long Term Evolution, LTE, compliant mobile wireless communications network, the method comprising at least one of: generating a measurement report including one or more CRS measurement result indicated by a trigger criterion received from a base station and one or more additionally reported CSI-RS measurement result; generating a measurement report including one or more CSI-RS measurement result indicated by a trigger criterion received from a base station and one or more additionally reported further CSI-RS measurement result; generating a measurement report including one or more CSI-RS measurement result indicated by a trigger criterion received from a base station and one or more additionally reported CRS measurement result; or generating a measurement report including one or more CSI-RS measurement result indicated by a trigger criterion received from a base station, one or more additionally reported further CSI-RS measurement result, and one or more additionally reported CRS measurement result.

According to an eleventh aspect of the present invention there is provided a method of operating a mobile terminal in a Long Term Evolution, LTE, compliant mobile wireless communications network when the mobile terminal is in an RRC-CONNECTED state, the method comprising: generating one or more CSI-RS measurement results and storing the measurement results at the mobile terminal for later transmission to a base station in response to one of: detecting at the mobile terminal a radio link failure; detecting at the mobile terminal a handover failure; and detecting at the mobile terminal a connection establishment failure.

According to a twelfth aspect of the present invention there is provided a method of operating a mobile terminal in a Long Term Evolution, LTE, compliant mobile wireless communications network when the mobile terminal is in an RRC-IDLE state, the method comprising: generating one or more CSI-RS measurement results and storing the measurement results at the mobile terminal for later transmission to a base station when the mobile terminal is in an RRC-CONNECTED state.

Another aspect of the invention provides a computer program comprising instructions arranged, when executed, to implement a method and/or apparatus in accordance with any one of the above-described aspects. A further aspect provides machine-readable storage storing such a program.

In accordance with an embodiment of the present invention, there is provided a method of operating a mobile terminal in a wireless communications network employing coordinated transmissions from multiple points towards the mobile terminal, in which the mobile terminal supports physical layer feedback on a set of non-cell-specific reference signals, the method comprising: in response to a report trigger, the mobile terminal generating a measurement report. In accordance with a first option the measurement report includes a first set of measurement data, the first set of measurement data including either cell-specific reference signal measurement data or non-cell-specific reference signal measurement data, and the measurement report includes a second set of measurement data in said measurement report, said second set of measurement data including non-cell-specific reference signal measurement data. In accordance with a second option the measurement report includes measurement data, including a first set of measurement data, the first set of measurement data including non-cell-specific reference signal measurement data, and the measurement report includes a second set of measurement data in said measurement report, said second set of measurement data including cell-specific reference signal measurement data.

Advantageously the first option allows the mobile terminal to provide a measurement report which includes data that can be used by the network during, for example, a handover or other mobility process. This in turn allows the network to prepare a base station, or eNB, better for the arrival of the mobile terminal upon handover.

In the first option, the report trigger may relate to an event comprising detection of a condition in the cell specific reference signals. Advantageously, the second set of measurement data is included in the measurement report even though the report trigger and the first set of measurement data relate to either cell specific reference signals in one case or non-cell specific reference signals in another case.

The report trigger may relate to an event comprising detection of a condition in the non-cell-specific reference signals. Advantageously, the first set of measurement data is included in the measurement report even though the report trigger and the second set of measurement data relate to non-cell-specific reference signals.

The report trigger may be the expiry of a timer. The report may be triggered periodically such that there is a predetermined time interval in-between successive reports.

The method may further comprise receiving configuration signalling from the network to configure the report trigger. Accordingly, the report trigger can be configured to relate to a suitable handover condition in the network (though the UE typically have no knowledge of the purpose of a particular trigger).

The report trigger may determine the measurement data included in the first measurement data.

In accordance with the first option, in case the first set of measurement data includes cell-specific reference signal measurement data, the second set of measurement data includes non-cell-specific reference signal measurement data for any frequency for which the mobile terminal has non-cell-specific reference signal measurement data available based on measurements the mobile terminal has previously been configured to perform.

In accordance with the first option, in case the first set of measurement data includes non-cell-specific reference signal measurement data, the second set of measurement data includes non-cell-specific reference signal measurement data for frequencies other than the frequency for which the report is triggered, and for which the mobile terminal has non-cell-specific reference signal measurement data available based on measurements the mobile terminal has previously been configured to perform.

In accordance with the second option, the second set of measurement data includes cell-specific reference signal measurement data for any frequency for which the mobile terminal has the cell-specific reference signal measurement data available based on measurements the mobile terminal has previously been configured to perform.

In accordance with the second option, the second set of measurement data includes cell-specific reference signal measurement data for frequencies other than the frequencies for which the mobile terminal has previously included cell-specific reference signal measurement data.

The set of frequencies for which the mobile terminal includes measurement data may be limited to a subset of the frequencies for which the mobile terminal has measurement data available.

The subset of frequencies for which the mobile terminal includes measurement data may be determined by a configuration parameter provided by the network.

The second set of measurement data comprises measurement data only on a limited number of best non-cell-specific reference signal resources according to the first option or best cells according to the second option. The number of best non-cell-specific reference signal resources or best cells for which the mobile terminal includes measurement data may be fixed. The number of best non-cell-specific reference signal resources for which the mobile includes measurement data may be determined by a configuration parameter provided by the network.

The method may further comprise receiving configuration signalling from the network comprising an indicator, and when the indicator is active, responding to the report trigger to generate the measurement report including the first and second set of measurement data, and when the indicator is inactive, responding to the report trigger to generate a measurement report not including the second set of measurement data. Advantageously, the generation of a measurement report containing both the first and second measurement data can be configured with an indicator. For mobile terminals that are not capable of generating such a measurement report, the indicator can be ignored. Also, in situations where the measurement report does not need to contain both the first and second measurement data, the indicator can be made inactive. The indicator may be activated by means of a flag, with a lack of flag rendering the indicator inactive.

The mobile terminal may include parameters for determining the second set of measurement data to include in the measurement report.

In accordance with the first option, the parameters may comprise an indication to include, in the second set of measurement data, non-cell-specific reference signal measurement data derived from reference signals on a carrier frequency associated with the report trigger.

In accordance with the first option, the parameters may comprise one or more carrier frequencies, and the second set of measurement data includes non-cell-specific reference signal measurement data derived from reference signals on the one or more carrier frequencies. Advantageously, in case the network provides the parameters, it is able to specify which frequencies it is interested in receiving non-cell-specific information for.

In accordance with the first option, the said one or more carrier frequencies may be a subset of the frequencies used for the first set of measurement data.

In accordance with the second option, the parameters may comprise an indication to include, in the second set of measurement data, cell-specific reference signal measurement data derived from reference signals on a carrier frequency associated with the report trigger.

In accordance with the second option, the parameters may comprise one or more carrier frequencies, and the second set of measurement data includes cell-specific reference signal measurement data derived from reference signals on the one or more carrier frequencies.

In accordance with the first option, the parameters may comprise an indication to include, in the second set of measurement data, non-cell-specific reference signal measurement data derived from reference signals on any carrier frequency.

In accordance with the first option, the parameters may comprise a threshold value, and the second set of measurement data contains measurements of non-cell-specific reference signals that exceed the threshold value. Advantageously, the second set of measurement data may only contain measurements that are suitable for a particular purpose, such as handover to a new cell.

In accordance with the first option, the parameters may comprise a threshold value, and the second set of measurement data contains measurements of non-cell-specific reference signals that differ from or fall within known measurement data by the threshold value.

In accordance with the first option, the parameters may comprise an indication of the maximum number non-cell-specific reference signals resources for which measurements of non-cell-specific reference signals may be included in the second set of measurement data.

In accordance with the first option, the non-cell-specific reference signal resources for which measurements are included may be the resources up to the maximum number which provide the best measurements. Advantageously, the measurement data in the second set can be limited to a manageable size. The second set of measurement data may, for example, include the three non-cell-specific measurements with the strongest signals or highest quality.

In accordance with the second option, the parameters may comprise an indication to include, in the second set of measurement data, cell-specific reference signal measurement data derived from reference signals on any carrier frequency.

In accordance with the second option, the parameters may comprise a threshold value, and the second set of measurement data contains measurements of cell-specific reference signals that exceed the threshold value.

In accordance with the second option, the parameters may comprise a threshold value, and the second set of measurement data contains measurements of cell-specific reference signals that differ from or fall within known measurement data by the threshold value.

In accordance with the second option, the parameters may comprise an indication of the maximum number of cell-specific reference signals resources for which measurements of cell-specific reference signals may be included in the second set of measurement data.

In accordance with the second option, the cell-specific reference signal resources up to the maximum number may be chosen to provide the best measurements.

The method may comprise receiving configuration signalling from the network to configure the parameters. Advantageously, the set of measurement data to be included in the measurement report can be adapted according to the requirements of the network. For example, the set of measurement data can be adapted according to the configuration of base stations in the network, or to a particular handover setup in the network.

The configuration parameters may apply to a plurality of report triggers such that a plurality of report triggers are configured upon receiving configuration signalling from the network. Advantageously, the same configuration parameters can apply to multiple report triggers. This in turn can simplify the configuration of the second set of measurement data for a variety of measurement report generation.

In accordance with the first option, the second set of measurement data includes non-cell-specific reference signals measurement data derived from reference signals received on all frequencies for which the mobile terminal has earlier provided non-cell-specific reference signals measurement data.

In accordance with the second option, the second set of measurement data may include cell-specific reference signal measurement data derived from reference signals received on a single carrier frequency for which the report is initiated.

In accordance with the second option, the second set of measurement data may include cell-specific reference signals measurement data derived from reference signals received on all frequencies for which the mobile terminal has earlier provided cell-specific reference signals measurement data.

In accordance with the second option, the method may comprise sending the measurement report to a base station of the network for the purpose of initiating a handover.

In accordance with another embodiment of the present invention, there is provided a method of operating a base station in a wireless communications network, in which the base station employs coordinated transmissions from multiple points towards a mobile terminal, the method comprising: connecting with a mobile terminal, broadcasting reference signals for measurement by the mobile terminal. In accordance with a first option the method further comprises receiving from the mobile terminal a first set of measurement data including cell-specific reference signal measurement data, and a second set of measurement data including non-cell-specific reference signal measurement data, determining that the mobile terminal should handover to a target base station, and sending a handover request to a target base station, the handover request including the second set of measurement data, for the purpose of enabling the target base station to configure the set of non-cell-specific resource signals for the mobile terminal.

The first option has an advantage that the target base station can be provided with information that enables it to configure transmission points of a CoMP configuration in anticipation of the mobile terminal handing over to the target base station. Since CoMP can improve the quality of a connection with a mobile terminal at cell-edge, this embodiment can in turn improve the chances of the mobile terminal successfully handing over to the target base station.

In accordance with a second option the method further comprises receiving from the mobile terminal physical layer feedback on a set of non-cell-specific reference signal resources, receiving from the mobile terminal a first set of measurement data including non-cell-specific reference signal measurement data, and a second set of measurement data including further non-cell-specific reference signal measurement data, determining that the mobile terminal should handover to a target base station, and sending a handover request to a target base station, the handover request including the second set of measurement data, for the purpose of enabling the target base station to configure the set of non-cell-specific resource signals for the mobile terminal.

In accordance with a third option the method further comprises receiving from the mobile terminal physical layer feedback on a set of non-cell-specific reference signal resources, receiving from the mobile terminal a first set of measurement data including non-cell-specific reference signal measurement data, and a second set of measurement data including cell-specific reference signal measurement data, determining that the mobile terminal should handover to a target base station, and sending a handover request to a target base station, the handover request including the second set of measurement data, for the purpose of enabling the target base station to configure the set of cell-specific resource signals for the mobile terminal.

The first set of measurement data may be received in a first measurement report, and the second set of measurement data is received in a second measurement report, the first measurement report arriving later than the second measurement report. Advantageously, earlier received channel state information can still be included in the handover request.

The method may comprise providing an indication in the handover request that the second measurement data was received from the mobile terminal earlier than the first measurement data. Advantageously, the target base station can be informed about how up to date the second measurement data is using the indication.

The first and second sets of measurement data may be received from the mobile terminal in a single measurement report. Advantageously, the most up to date information on the second set of measurement data can be included in the single measurement report.

The method may further comprise providing an indication in the handover request that the first and second sets of measurement data were received from the mobile terminal in a single measurement report. Advantageously, the target base station can be informed that the information in the first and second sets of measurement data is relatively up to date.

The method may further comprise determining that the mobile terminal should handover on the basis of the first set of measurement data. Advantageously, handover decision can be made in a relatively straightforward way without needing to take account of the second set of measurement data.

The method may further comprise determining that the mobile terminal should handover on the basis of a capacity determination at the base station. Advantageously, the base station is able to decide on the handover of the mobile station independently of the first and second measurement data.

The handover request may include the measurement data in mobile terminal context data, or radio resource management configuration data.

The non-cell-specific reference signals may be channel state information reference signals.

In accordance with another embodiment of the present invention, there is provided a method of operating a base station in a wireless communications network, in which the base station employs coordinated transmissions from multiple points towards a mobile terminal, the method comprising: determining a set of channel state indicator reference signal resources associated with the transmissions from multiple points, and transmitting configuration data about the set of channel state indicator reference signal resources to a neighbouring base station, for the purpose of indicating to the neighbouring base station what measurement data the base station would like to receive, during handover preparation, for the channel state indicator reference signal resources. Advantageously, a target base station can inform a source base station what measurements should be made on channel state information reference signal resources in advance of any handover situation.

The configuration data may include parameters for the channel state indicator reference signal resources. Advantageously, the target base station can share information to enable listening and measuring on the specified CSI-RS resources. The parameters may include scrambling identity information for one or more of the channel state information reference signal resources, and/or resource configuration information for one or more of the channel state information reference signal resources.

The parameters may include scrambling identity information for one or more of the channel state indicator reference signal resources.

The parameters may include resource configuration information for one or more of the channel state indicator reference signal resources.

The configuration data may include an identification of an area for which the channel state indicator reference signal resources are relevant.

In accordance with another embodiment of the present invention, there is provided a method of operating a mobile terminal in a wireless communications network employing coordinated transmissions from multiple points towards the mobile terminal, in which the mobile terminal supports physical layer feedback on a set of non-cell-specific reference signals.

In a first option the method further comprises, in response to a handover failure report request from the network, the mobile terminal generating a report including measurement data; including a first set of measurement data, the first set of measurement data including either cell-specific reference signal measurement data or non-cell-specific reference signal measurement data; and including a second set of measurement data in said measurement report, said second set of measurement data including non-cell-specific reference signal measurement data.

In a second option the method further comprises, in response to a connection establishment failure report request from the network, the mobile terminal generating a report including measurement data; including a first set of measurement data, the first set of measurement data including either cell-specific reference signal measurement data or non-cell-specific reference signal measurement data; and including a second set of measurement data in said measurement report, said second set of measurement data including non-cell-specific reference signal measurement data.

In a third option the method further comprises, in response to a handover failure report request from the network, the mobile terminal generating a report including measurement data; including a first set of measurement data, the first set of measurement data including either cell-specific reference signal measurement data or non-cell-specific reference signal measurement data; and including a second set of measurement data in said measurement report, said second set of measurement data including non-cell-specific reference signal measurement data.

In a fourth option the method further comprises, in an idle mode, periodically logging measurement data on cell-specific reference signals and non-cell-specific reference signals; and in response to a request from the network, a periodic logging trigger in an idle mode, the mobile terminal generating a report including a first set of measurement data, the first set of measurement data including either cell-specific reference signal measurement data or non-cell-specific reference signal measurement data; and a second set of measurement data in said measurement report, said second set of measurement data including non-cell-specific reference signal measurement data.

BRIEF DESCRIPTION OF DRAWINGS

Embodiments of the invention are further described hereinafter with reference to the accompanying drawings, in which:

FIG. 1 schematically illustrates an overview of an LTE mobile communication network;

FIG. 2 is a schematic diagram illustrating a typical LTE system using multiple Transmission Points (TPs);

FIG. 3 is a schematic diagram illustrating the protocol stack for the control plane within an LTE system;

FIG. 4 is a signalling diagram illustrating signals flowing between a UE, a source eNB, and a target eNB during a handover procedure;

FIG. 5 is a flow diagram illustrating modified steps executed at a mobile station when generating a measurement report, in accordance with an embodiment of the present invention;

FIG. 6 is a flow diagram illustrating modified steps executed at a mobile station when generating a handover request, in accordance with an embodiment of the present invention;

FIG. 7 is a flow diagram illustrating modified steps executed at a source eNB when preparing a configuration message prior to handover, in accordance with an embodiment of the present invention;

FIG. 8 is another flow diagram illustrating modified steps executed at a source eNB when preparing a configuration message during handover, in accordance with an embodiment of the present invention;

FIG. 9 is a signalling diagram illustrating signals including additional measurement reporting during a handover procedure in accordance with an embodiment of the present invention; and FIG. 10 is a signalling diagram illustrating signals transmitted between a UE and an eNB when configuring an L3 reporting set and reconfiguring an L1 feedback set.

MODE FOR THE INVENTION

Embodiments of the invention will now be described in the context of an LTE compliant mobile wireless communications network operating in accordance with Release-11 and beyond of the 3GPP LTE standards. However, it will be understood that this is by way of example only and that other embodiments may involve other wireless networks, operating in compliance with other releases and other standards.

A typical LTE mobile wireless communications network suitable for implementing CoMP is illustrated schematically in FIG. 2. The LTE system comprises the EPC core network 106, the E-UTRAN radio access network 104, one or more UEs 102, and typically an interface to external networks such as the internet or private corporate networks. The E-UTRAN 104 handles communications between UEs 102 and the EPC core network 106.

The E-UTRAN 104 consists of a network of eNBs of which two eNBs eNB1 and eNB2 are identified as 150 and 152. Each eNB serves and controls UEs in one or more cells. In FIG. 2, eNB 150 is the serving eNB for a group of cells including cell 154 and UE 102 can communicate with eNB 150 for instance via cell 154, while eNB 152 is the serving eNB for a group of cells including cell 156. The eNBs 150, 152 can communicate with each other over an optional X2 interface, to the evolved packet core (EPC) via the S1 interface (specifically, the S1 interface connects the eNBs 150, 152 to the MME 114), and to the UE 102 over the radio interface. Within the EPC in FIG. 2 the MME 114 is shown, as well as the S-GW 110 and the P-GW 112 (shown as being collocated). The MME 114 handles high-level issues such as security, while the S-GW 110 and P-GW 112 are responsible for data traffic, including data to or from external networks. FIG. 2 also shows the eNBs 150, 152 being directly coupled to the 5-GW/P-GW 110, 112.

As discussed above, conventionally each UE 102 communicates with an eNB through a single cell such as cells 154, 156 (that is, via a single antenna connected to the eNB). CoMP refers to any type of coordination between radio communications that take place in cells that are sufficiently close to one another to at least partially overlap. CoMP may be deployed in the uplink (UL) and downlink (DL) directions. When transmitting data to the UE in the downlink direction, the network may employ multiple transmission points (TP), a TP being a set of geographical co-located transmit antennas. When using CoMP in DL, the eNB coordinates the signals transmitted from the different TPs to increase signal strength or to reduce co-channel interference as perceived by the UE. The UE may be unaware of which transmission points are actually involved in a transmission (contributing or blanking) In the DL direction there are two main varieties of CoMP: Coordinated Scheduling and Beam Forming (CS/CB), and Joint Processing (JP). CS/CB comprises a UE receiving data from only one TP at a time. However, the network coordinates its scheduling and beam forming with nearby TPs so as to minimize inter-cell interference. In JP the UE receives data from multiple TPs simultaneously. For both options each TP may be may be controlled by the same eNB, or separate eNBs.

To activate CoMP each eNB 150, 152 controls multiple TPs per serving frequency which are geographically remote from each other. In this illustration, the transmission points are implemented as remote radio heads (RRHs). However, the transmission points may be implemented in other ways such as via Pico-cells. The transmission points are coupled to their respective eNBs via suitable high capacity and low latency data connections such as fibre optic links. The connections are made at a distance so that the transmission points can be located remotely from the geographic location of the eNB itself. The transmission points are also geographically remote from each other, which in practice means they may be at least a few meters apart. Specifically, eNB 150 controls TPs TP4, TP5 and TP6, and TP4 may transmit in cell 154 (the cells for the other TPs not being specifically marked). Similarly, eNB 152 controls TPs TP1, TP2 and TP3, and TP1 may transmit in cell 156 (the cells for the other TPs not being specifically marked).

As discussed above, the UE may be configured to provide information in the form of feedback to the eNB to assist the eNB in determining which TPs to use when scheduling a particular CoMP data transmission. For instance, eNB 150 may send a configuration message to UE 102 causing the UE 102 to generate measurements of reference signals transmitted from the transmission points using physical layer (PHY) procedures (Layer 1 in FIG. 3, discussed below). Specifically, the reference signals used for this purpose are CSI-RSs. The CSI-RSs can be configured in a number of ways which are identifiable and readable provided a UE is aware of the configuration. Each configuration of a CSI-RS is known as a CSI-RS resource. The Layer 1 feedback is based on these CSI-RS resources. Typically, each transmission point (TP) is assigned with a CSI-RS resource, though two TPs could transmit the same CSI-RS information and the UE detects and measures this as though it were transmitted from a single TP.

The CSI-RS measurement results are sent to the eNB 150 in a measurement report. The eNB uses this information to configure the transmission points TP4, TP5 and/or TP6 to be used in CoMP. Additionally, eNB 150 may communicate with eNB 152 to configure transmission points TP1, TP2 and/or TP3 in the event that the TPs used for CoMP are controlled by more than one eNB.

The CSI-RS resources for which the UE is configured to provide feedback using physical layer procedures may be referred to as a Layer 1 (L1) feedback set. The UE may, for instance, be required to support an L1 feedback set including up to three CSI-RS resources. In one embodiment this may correspond to three transmission points (TPs) being used for CoMP with CSI-RS feedback provided for each TP.

In FIG. 2, UE 102 may receive transmissions from the eNB using CoMP via the transmission points TP4, TP5, and TP6, and may be configured to provide feedback using physical layer procedures on three CSI-RS resources, one for each TP.

Due to the mobility of the UE, the most optimal set of CSI-RS resources to be configured as the L1 feedback set may change. Thus, the E-UTRAN may continuously decide which CSI-RS resources should be configured for the UE from a number of potential CSI-RS resource candidates. In order to make these decisions, the UE may be configured to provide information in the form of a measurement report on potential CSI-RS resource candidates to the E-UTRAN. Since the E-UTRAN is aware of the mapping of the CSI-RS resources to the Transmission Points, this process allows the E-UTRAN to pick the most appropriate TPs for CoMP.

This measurement report may use RRC procedures (procedures at Layer 3, L3, in the diagram of FIG. 3, discussed below), to provide information on potential TPs, by referring to their associated CSI-RS resources. The CSI-RS resources for which the UE is configured to provide feedback using RRC procedures may be referred to here as the L3 reporting set. The L1 feedback set and the L3 reporting set are configured independently of one another, though typically the L1 feedback set may be part of the L3 reporting set. The UE may not be aware of which TPs correspond to the specific CSI-RS resources comprising the L1 feedback set or the L3 reporting set.

The E-UTRAN may use the L3 reporting set to manage the L1 feedback set. For example, with reference to FIG. 2, the eNB 150 may send an RRC connection reconfiguration request (Layer 3) to the UE 102 asking the UE to report back on potential CSI-RS resources which the eNB 150 knows are assigned to certain TPs. For example, eNB1 may request the UE to report back on CSI-RS resources 1 to 6 associated with TPs 1 to 6 (the L3 reporting set). At the same time, the UE may already be configured to provide feedback on Layer 1 for transmission points TP4, TP5, and TP6 (the L1 feedback set).

If, for example, one of the CSI-RS resources becomes better than a threshold value (say, the CSI-RS resource associated with TP2) then the information on that CSI-RS resource may be reported back to eNB1 using a Layer 3 measurement report for the purpose of deciding if the L1 feedback set should be modified.

The eNB 150 may then decide to modify the CSI-RS resource L1 feedback set. To do this, the eNB1 may use an RRC connection reconfiguration request on Layer 3 to specify which three CSI-RS resources should be used to provide feedback on Layer 1 (L1 feedback set).

In order to clarify the signalling messages transmitted within the network shown in FIGS. 1 and 2, FIG. 3 illustrates the communication protocol layers for the E-UTRAN 104 and the EPC 106 between eNB 150, UE 102, and the MME 114 in the control plane.

The Non-Access Stratum (NAS) layer 250 is known as the NAS control protocol (terminated at MME on the network side) and performs at least the following functions: EPS bearer management, authentication, ECM-IDLE mobility handling, paging origination in ECM-IDLE, and security control.

The Radio Resource Control (RRC) layer 255 (terminated at the eNB on the network side) is part of Layer 3 in the OSI model, and performs at least the following functions: broadcast, paging, RRC connection management, Radio Bearer (RB) control, Mobility functions, and UE measurement reporting and control.

The Packet Data Convergence Protocol (PDCP) layer 260 (terminated at the eNB on the network side) is part of Layer 2 in the OSI model, and performs functions for the control plane including at least: ciphering and integrity protection.

The Radio Link Control (RLC) and Medium Access Control (MAC) layers 265, 270 (terminated at the eNB on the network side) are also part of Layer 2 in the OSI model, and perform functions for the control plan including at least: scheduling information reporting, priority handling between UEs by means of dynamic scheduling, padding, paging, and duplicate detection.

The lowest protocol layer is the Physical Layer (PHY) 275 which comprises Layer 1 of the OSI model. The physical layer performs the digital and analogue signal processing functions that the UE and eNB use to send and receive information.

According to conventional LTE networks, when eNB 150 (the source eNB) determines that UE 102 should be handed over to eNB 152 (the target eNB) it is not possible for target eNB 152 to immediately activate CoMP. Consequently, upon handover to target eNB 152, the UE 102 communicates with eNB 152 via a single cell (for instance cell 156) and therefore a single TP. Base station 152 may later initiate CoMP by sending a configuration message to UE 102 to request an appropriate set of CSI-RS measurement results from the UE 102 (by configuring an L1 feedback set). A conventional LTE handover procedure will now be described in connection with FIG. 4. FIG. 4 assumes that the UE is served by a single serving cell (that is, CA is not activated) and is to be handed over to a single serving cell controlled by a different eNB. The conventional handover procedure of FIG. 4 has no mechanism for activating downlink CoMP transmission immediately upon handover.

In LTE, the network controls the mobility of a UE that is in connected mode (or, to be precise, in RRC-CONNECTED state). In other words, the network decides with which cell the UE maintains the radio connection (also referred to as the serving cell). The network applies the handover procedure to move the UE from one cell, the serving cell controlled by a source eNB, to another cell, the target cell controlled by a target eNB.

The network decides the cell the UE should connect to typically based on radio quality, but it may also take into account other factors such as cell load, UE capabilities and the type of bearers that are being established. To assist the handover decision process, the network normally configures the UE to perform CRS measurements on the serving frequency, on other E-UTRAN frequencies (referred to as inter-frequency measurements) and/or on frequencies used by other Radio Access Technologies (referred to as inter-RAT measurements).

Handover in LTE may use the X2 interface (the best performing and simpler option, but requires a direct connection between the eNBs) or the S1 interface shown in FIG. 2. The procedure for handover between cells controlled by a single eNB is less complex as there is no need for data to be transferred across the X2 or S1 interfaces. Referring to FIG. 4, there is shown, by way of example, the X2 interface handover procedure. The UE procedures and the information exchanged between the UE and E-UTRAN at the time of handover are specified in greater detail in 3GPP TS 36.331, Evolved Universal Terrestrial Radio Access (E-UTRA); Radio Resource Control (RRC); Protocol specification. The E-UTRAN procedures and the information exchanged by eNBs are specified in greater detail in 3GPP TS 36.423, Evolved Universal Terrestrial Radio Access Network (E-UTRAN); X2 application protocol (X2AP). FIG. 4 identifies the main steps of the handover procedure.

Step 401: The UE is configured to report back on CRS measurements when a handover trigger condition is met (such as a neighbouring cell CRS signal strength exceeding the serving cell CRS signal strength). The source eNB sends a measurement control signal to the UE. Packet data transfer between the UE and the source eNB can then take place. The source eNB may also send an UL allocation message to the mobile station indicating a change to the frequencies to be used by the UE in the uplink.

Step 402 (optional): The UE may send a measurement report to the source eNB that it has detected a neighbouring cell that meets the measurement report triggering criteria, based on CRS measurements.

Step 403: Based on the provided measurement information and/or other knowledge present in the source eNB, the source eNB can now decide whether or not to start a handover preparation.

Step 404: If the source eNB decides to perform a handover, it starts handover preparation by sending a HANDOVER REQUEST message defined in TS 36.413 to the target eNB. This message carries the handover preparation information within the HandoverPreparationInformation message defined in 3GPP TS 36.331. This message includes: the UE radio access capabilities, the current radio access (that is, the access stratum, AS) configuration, the RRM configuration (information kept only by the eNB that is used primarily for Radio Resource Management? usage of this information is up to the eNB implementation), the radio access (AS) context (information kept only by the eNB—not exchanged across the radio interface, for instance information needed to perform RRC connection re-establishment) and the target cell identification.

Step 405: The target eNB decides based on admission control criteria whether it wishes to accept the handover request.

Step 406: If the target eNB accepts the handover, it reserves the radio resources and decides the details of the radio access configuration to be used by the UE in the target cell. This configuration is returned to the source eNB within the HANDOVER REQUEST ACK message defined in 3GPP TS 36.331. This message carries the radio access configuration within the HandoverCommand message in which is embedded an RRCConnectionReconfiguration message defined in 3GPP TS 36.331. HandoverCommand is an inter-node RRC message, and the reconfiguration is a normal message exchanged across the radio interface. When used to perform a handover within the E-UTRAN, this message includes the radio access configuration to be used in the target cell: the measurement configuration, the mobility control information, the UE-specific radio resource configuration, and the security configuration. The measurement configuration is expressed by a delta compared to the configuration used in the source base cell (indicating changes in measurement configuration). The mobility control information specifies the target cell identity (by means of an cell identity) and characteristics (a frequency, a bandwidth and additional spectrum emission information, all only if different from what is used in the source cell: a delta), the new radio access identity to be used in the target cell, the cell specific radio resource configuration (common for all UEs), dedicated resources used for initial access in the target cell and a timer to limit the duration the UE tries connecting to the target eNB. The UE-specific radio resource configuration (the dedicated radio configuration), is also expressed as a delta compared to the configuration used in the source cell. The security configuration comprises the algorithms, if different from the ones used in the source cell (delta), as well as parameters affecting the derivation of radio access security keys (that is, an indication whether a new base key is to be used and a counter that is incremented upon every handover).

At this stage the source eNB may send a DL allocation message to the UE.

Step 407: When the source eNB proceeds with the handover, it starts the execution phase, in which the source eNB transparently forwards RRCConnectionReconfiguration messages received from the target eNB to the mobile station. The source eNB does not change the message contents. The source does however perform integrity protection and ciphering of the message. The mobile station can then detach from the source eNB and attempt to connect to the target eNB.

Referring now to FIG. 10, the signalling procedure for configuration and reporting of a L3 reporting set followed by reconfiguration of a L1 feedback set will now be described in connection with a conventional LTE network implementing CoMP. FIG. 10 illustrates the basic message sequence for how E-UTRAN uses the L3 reporting set to manage the L1 feedback set.

At step 1001 the eNB sends an RRCConnectionReconfiguration message to the UE to configure L3 measurement reporting. The CSI-RS resources for the L3 reporting set (for instance CSI-RS resources A to F) are configured by the eNB as part of the measurement object (that is, the field/parameter measObject). Other parameters affecting the reporting by the UE are configured in the reporting configuration (for instance the field reportConfig), parameters defining the (event) trigger conditions or parameters defining what the UE shall report (for example, a new event C1: L3 CSI-RS resource becomes better than threshold).

At step 1002 the UE sends a measurement report regarding L3 CSI-RS resources. When the triggering condition is met, the UE initiates a measurement report including measurement results for part of the L3 reporting set (for example those CSI-RS resources that have now or previously met the triggering condition and have not met the leaving condition). The measurement report also includes some information not relevant for configuring the L1 feedback set, namely the CRS based measurement results of the PCell. As an example, the measurement report message may indicate that two L3 CSI-RS resources are better than the threshold (for example, A and C)

At step 1003 the eNB sends an RRCConnectionReconfiguration message to the UE to configure the L1 feedback set. The eNB configures a L1 feedback set, initially only comprising of the best of the CSI-RS resources included in the previous measurement report.

At step 1004 the UE sends a reconfiguration complete message to the eNB indicating successfully completion of the reconfiguration.

Subsequently steps 1001 to 1004 may be repeated.

As discussed in relation to handover, when a UE is in an RRC-CONNECTED state the E-UTRAN is in control of UE mobility. It may configure the UE to provide measurement reports to assist the network with this task. The measurements currently defined for the purpose of assisting UE mobility are based on CRS measurement results.

A single CRS measurement always concerns a single frequency. The UE may however be configured to perform multiple measurements at the same time. For each CRS measurement, the E-UTRAN configures when the UE should send a Measurement Report message, including the related CRS measurement information. This is done by specifying so-called triggering conditions, of which there are two basic types namely periodic and event triggered. In case of periodic triggering, the UE provides a report at regular intervals, possibly up to a configurable number of reports.

Both periodic and event triggered reports can be used for handover (HO) but event triggered is more commonly used in order to limit the reporting signalling overhead. In case the UE is configured for event triggered reporting, it provides a report when certain conditions (for instance entering or leaving a cell) are met for one or more applicable cells. The CRS measurement report includes measurement results for the serving cell as well as for cells on the frequency for which the measurement was configured, that triggered the entering condition but not the leaving condition (referred to as the cellsTriggered).

When the UE is configured with Carrier Aggregation (CA), it is connected to more than one cell—one on each frequency. There is one primary cell, referred to as the PCell, which is used for a number of essential functions. The other cells, referred to a secondary cells or SCells, are merely used to enhance the data transfer rate. Mobile terminal mobility may result in either change of PCell as well as in the addition/removal of SCells. When the UE is configured with a single serving cell (that is, the UE is not configured with CA), the concerned cell is (still) referred to as PCell.

With the introduction of CA, the measurement reporting procedures are extended somewhat. The UE now always includes CRS measurement results for all serving cells in a CRS measurement report message (if those measurement results are available). Moreover, for each individual measurement E-UTRAN can indicate if the UE shall also include the best non-serving cell on each frequency the UE is configured to measure/for which the UE has measurements available. This reporting of cells on other frequencies (other than the frequency of the associate measurement) is also referred to as additional measurement reporting. The mechanism was introduced to facilitate the immediate configuration of SCells upon handover.

CoMP transmission is a mechanism that is particularly relevant at cell edge. At cell edge CoMP provides most performance gains. Hence it is desirable to activate CoMP immediately after a handover has been established. However, conventionally, the target eNB can only blindly configure an L1 feedback set upon handover completion, as it does not have any available CSI-RS measurement results. Such a blindly configured L1 feedback set may not allow for optimal CoMP. In order to generate an optimal L1 feedback set the target eNB must first configure suitable measurement reporting from the UE and then wait for the UE to send a measurement report. Consequently there is a delay until the target eNB can configure the UE to provide the necessary measurement results before CoMP can be optimised. That is, according to known LTE networks it is possible to optimally configure CoMP after handover, but only after a delay. In accordance with certain embodiments of the present invention the target eNB can be provided with up to date CSI-RS measurement information from the source eNB so that it can configure and send an optimal L1 feedback set in the handover message sent to the source eNB and then on to the UE. The UE may then immediately begin to provide L1 feedback set measurement reports to the target eNB upon handover completion. The optimal L1 feedback set is sent from the target eNB to the source eNB in an RRCConnectionReconfiguration message including field mobilityControlInfo.

In accordance with certain embodiments of the present invention the source eNB has knowledge of the CSI-RS resources that are likely to be relevant only after handover. The source eNB can make sure that the UE has CSI-RS measurements available for these resources when handover is imminent.

To ensure that CoMP can begin immediately after handover before the target eNB has received CSI-RS measurement results directly from the UE, in accordance with certain embodiments of the present invention the source eNB provides the target eNB with up to date CSI-RS measurement results. In one specific embodiment, the UE provides available CSI-RS measurement results to the source eNB when handover is imminent, which the source eNB subsequently transfers to the target eNB when initiating handover preparation. In other embodiments, the source eNB may provide CSI-RS measurement results to the target eNB that have been stored at the source eNB in addition to or in place of new results received when handover is imminent.

FIG. 5 illustrates the procedure for providing up to date CSI-RS measurements from a source eNB to a target eNB in a handover scenario in accordance with an embodiment of the present invention. In step 510, the UE measures a CRS value and determines that a condition based on CRS criteria has been satisfied. The condition may relate to a handover, the UE may have no knowledge of purpose of any particular condition. This event triggers the UE to prepare in step 520 a measurement report containing the relevant CRS measurement data related to the event, such as the CRS measurements associated with a possible target eNB. In step 530, the UE determines if additional reporting has been configured for this particular measurement. If no additional reporting has been configured in the UE then the UE reports the measurement report to the eNB in step 550. The eNB can then use the CRS measurement report to determine if the handover should occur. If the UE is configured with additional reporting in accordance with the present invention (that is, the source eNB has configured the UE to additionally report CSI-RS measurement results in a CRS measurement report triggering handover) then the procedure follows step 540 after step 530. In step 540, the UE includes available CSI-RS measurement data in the previously generated measurement report containing CRS measurement data.

In step 550, the UE sends the measurement report containing both CRS and CSI-RS measurement data to the eNB.

As an alternative to the above procedure, it is possible that the handover trigger event could be based on CSI-RS measurements. Here, in step 510, the UE would measure a CSI-RS value and determine that a condition based on CSI-RS criteria has been satisfied. The condition could, for example, be based on an absolute or relative threshold value being exceeded by the CSI-RS measurement value. The CSI-RS resources for which the measurements are made could relate to transmission points on a non-serving frequency which could then make handover desirable. Handover can be performed for a number of reasons. One reason for performing a handover is that a higher data rate is possible on another frequency. A CSI-RS based measurement report may indicate that it is possible to deploy CoMP on another frequency, resulting in good data rates. However, a CRS based measurement may provide additional information, for instance about the stability/robustness/reliability of the connection on that frequency. The network may benefit from having both types of information available when determining whether to perform a handover. Additionally, it may be that one measure is more dynamic/instantaneous (for instance CSI-RS) while the other may be averaged out (for instance CRS). Both may be useful for deciding when to perform a handover.

In the case that handover is triggered by CSI-RS measured values, it is possible to then include the specific CSI-RS measurements in the measurement report. Furthermore, CRS based measurements can be additionally reported in the measurement report triggered by the CSI-RS event in accordance with certain embodiments of the present invention. In this case, the CSI-RS measurements might give some indication about a data rate that can be achieved when employing CoMP, while the CRS based measurements may provide some general indication of the strength or quality when configuring a cell on the concerned frequency.

In a further alternative, in accordance with certain embodiments of the present invention specific CSI-RS measurements may trigger a measurement report for the purposes of handover, and the measurement report may additionally report CSI-RS measurement data unrelated to the trigger. For example, the additionally reported CSI-RS measurement data may include CSI-RS measurements on a non-serving frequency. In this case, the CRS based measurement data in the measurement report may be optional. CRS measurement results may additionally be reported in the measurement report.

In accordance with certain embodiments of the present invention, additionally reported CSI-RS measurement results may relate to CSI-RS resources relating to TPs controlled by an eNB, identified by a target eNB and sent to neighbouring eNBs as part of an optimal L1 feedback set for that eNB, such that the neighbouring eNBs may obtain up to date CSI-RS measurement results for those resources in advance of handover. In particular, a first eNB may indicate to a second eNB a set of potential TPs the first eNB might configure (as an L1 feedback set). More generally, the first eNB may indicate to the second eNB one or more TPs for which the first eNB would like to receive measurement information during handover preparation from the second eNB. The first eNB may indicate for each TP (or more specifically for each CSI-RS resource, in the event that two or more TPs share a CSI-RS resource) in which area they are relevant so that the second eNB only configures the UE to measure CSI-RS resources that are relevant in the area when the UE is in that area.

Prior to step 510 in FIG. 5, the eNB configures the UE with the relevant handover configuration reporting triggers as discussed in relation to FIG. 4. Furthermore, in accordance with certain embodiments of the present invention, the eNB may further configure the additional reporting referred to in step 530 in FIG. 5, while in certain other embodiments there may be no configuration and the additional reporting may be fixed in the LTE standards. If configuration is enabled, the additional reporting configuration signalling may include one or more of the following:

a) One or more control parameter indicating whether the additional reporting is configured or not. A control parameter may comprise an on/off indicator to switch on or off the additional reporting configuration in the UE. Alternatively or additionally, a control parameter may comprise an indicator to switch the additional reporting on or off per measurement. The indicator may be in the form of a 1-bit indication in the message from the eNB to the UE. Other types of flag may also be suitable. If the additional reporting configuration in the UE has been switched off by the on/off indicator, then the answer to step 530 in FIG. 5 will be no (N). If the additional reporting configuration in the UE has been switched on by the on/off indicator, then the answer to step 530 in FIG. 5 will be yes (Y). The current status of the on/off configuration can be stored in a register in the UE so that in step 530 the register is checked to see what would be the correct outcome of the decision step 530. A control parameter may thus either apply to all measurements configured, or more likely be provided per measurement. In the first case, a parameter may be provided in a measurement configuration message from the eNB so that they are understood to apply to all measurement reports. In the second case, a parameter may be provided in the configuration of each measurement separately. In the second case, a flag may be provided in the part of the configuration that specifies the type of trigger and the information to report (the reporting configuration).

b) One or more control parameter controlling the frequencies to be additionally reported. A control parameter may be an indication that the UE should report in step 540 on any CSI-RS measurements available in the UE irrespective of the frequency the measurement has been made on. Alternatively or additionally, a control parameter may be an indication that the UE should report in step 540 on the CSI-RS measurements available in the UE that are on the same frequency as the frequency of the signal triggering the measurement report in step 510. Alternatively or additionally, a control parameter may be a list of specific frequencies, whereby the UE should report in step 540 on the CSI-RS measurements available in the UE that are on one of the listed frequencies. Alternatively or additionally, a control parameter may be a maximum number N of CSI-RS resources that may be included in the report, whereby the UE may select the CSI-RS measurements to report up to the maximum N by, for example, grading the CSI-RS measurements and only reporting the N best results. In the event that CoMP has been configured on multiple frequencies, then the value N may specify the maximum number of best CSI-RS resources on a frequency. Alternatively or additionally, a control parameter may be a threshold value X, whereby the UE only includes CSI-RS measurements which exceed the threshold value X. Also there could be a relative threshold Y such that the UE can include CSI-RS measurements that fall within an offset Y from an earlier configured CSI-RS resource, for example the best CSI-RS resource has to exceed X while additional CSI-RS resources must fall within Y compared to the best CSI-RS resource.

The UE may be configured separately to make measurements on CSI-RS resources for other purposes such as determining the L1 feedback set for the CSI-RS resources. These measurements made for other purposes can be included in the additional reporting of step 540 in accordance with the above additional reporting configurations. Alternatively or additionally, the UE can make measurements of CSI-RS resources specifically in accordance with the above additional reporting configurations.

LTE uses a measurement model which has three parts: a measurement object, a reporting configuration and a measurement identity. The measurement object provides a set of measurements to perform, for instance a set of cells of a certain radio access type (for example, all cells on an LTE frequency, a list of cells on a UMTS frequency, a list of GSM cells/frequencies, etc.). The reporting configuration indicates when the UE should trigger a measurement report as well as which information the UE shall include in this report. It can indicate that a report should be triggered in case a particular event occurs (for example, event A3: a neighbour cell becomes a certain offset better than the current serving cell). Alternatively it can indicate that periodic reporting is applicable, in which case the UE provides measurement reports at regular intervals (up to a configurable number of times) including a configurable number of cells in order of measurement result, that is best cell first. The measurement identity links a measurement object to a reporting configuration. It is possible to link multiple reporting configurations to the same measurement object, and to link one reporting configuration to multiple measurement objects through a single measurement identify. By smartly linking measurement objects and measurement report configurations multiple times, the signalling overhead can be minimised. Specifically, by only defining a new measurement identity which links an existing measurement object to an existing report configuration, a new measurement is defined.

As mentioned previously, 3GPP Release-10 introduces carrier aggregation (CA) in which a UE may be configured with multiple carriers, referred to as carrier components (CCs). A UE may be configured with intra-frequency measurements on each of these 'serving frequencies'. In addition, the UE may be configured with inter-frequency measurements for instance, comparing a configured CC/serving frequency with a not configured CC/neighbouring frequency. When using CA a primary CC (PCC) is defined and one or more secondary CCs (PCCs). For instance a UE may be configured to use the following configuration: frequency f1 is used as PCC, while frequency f2 is used as SCC. The UE can perform intra-frequency measurements on both f1 and f2. The UE can perform an inter-frequency measurement on f3 that is, comparing the serving cell on f1 with neighbouring cells on f3.

The above additional reporting configurations in connection with FIG. 5 allow the UE to trigger numerous measurement reports for one such measurement. For example, whenever a new cell meets the entry criteria and/or whenever a cell that previously triggered the entry condition now triggers the leave condition.

If configured to do so by the eNB, the UE may additionally report the CSI-RS resources for all available frequencies. The reporting for serving frequencies may be separate from the reporting for non-serving frequencies.

Furthermore, if CoMP is configured over multiple frequencies, the reporting for frequencies for which CoMP is configured may be separate from frequencies for which CoMP is not configured. In this case, the reporting for frequencies for which CoMP is not configured can be split further into reporting for serving and non-serving frequencies.

Currently measurements can be made for CSI-RS resources only on serving frequencies used by the source eNB. In other embodiments included within the scope of present invention, measurements can also be made for CSI-RS resources for non-serving frequencies, or for frequencies that are not used by the source eNB.

Referring now to FIG. 6, there is shown a mechanism by which a source eNB can provide information to a target eNB to enable the target eNB to initiate CoMP upon handover, in accordance with one specific embodiment of the present invention. Available CSI-RS measurements additionally reported by the UE to the source eNB (either in a measurement report that triggers handover or provided earlier) together with CSI-RS measurement results that are provided to the source eNB as part of triggered CSI-RS measurement reports are available to be transferred to the target eNB. As has been previously noted, in other embodiments of the invention CSI-RS measurement results may be additionally reported within CRS based reports. At the time of handover, the source eNB may be arranged to select CSI-RS measurement results that are indicated by the target eNB to be necessary for CoMP to begin immediately after handover and to transfer the selected CSI-RS measurement results to the target eNB during handover preparation in accordance with certain embodiments of the present invention. In step 610, the UE triggers a measurement report and additionally reports CSI-RS measurement data, for example, as set out in steps 510 to 550 in FIG. 5. In step 620, the source eNB decides that a handover should take place, and initiates the handover preparation by sending a HO request to the neighbouring target eNB including the additional CSI-RS measurements received from the UE. In step 630, the handover procedure continues, for example, following the general procedure outlined in FIG. 4.

In step 620, the source eNB may either forward L3 CSI-RS measurement information stored when previously receiving a measurement report (for example, a measurement report specifically for the purpose L1 CSI-RS management), or it may forward CSI-RS measurement information additionally included by the UE in the measurement report that triggered the handover. The source eNB may indicate to the target eNB whether the forwarded information was freshly received from the UE (just before it initiated handover).

The decision to handover in step 620 may be due to information received in a measurement report received by the source eNB. Alternatively, the source eNB may decide to initiate a handover of the UE for other reasons such as congestion on the source eNB. In this alternative handover, the source eNB may forward CSI-RS measurement data received from earlier measurement reports.

The source eNB can forward the L3 CSI-RS measurement information either by including it in the UE context or by including it in the RRM configuration.

In accordance with certain embodiments of the present invention, the source eNB is provided with knowledge of the CSI-RS resources that are relevant after handover. Preferably, the source eNB has this information, so it can ensure that the UE has CSI-RS measurements available for these resources when handover is imminent.

Referring to FIG. 7, there is illustrated a general procedure for addressing the configuration of a UE for CSI-RS measurement reporting. In step 710, the UE is connected with a source eNB, and approaches a cell served by a potential target eNB (here a neighbour eNB). In step 720, the source eNB determines if CoMP is employed for the cell controlled by a neighbour eNB (based on configuration information previously received from the neighbour eNB). If CoMP is not employed then the procedure continues to step 740 where normal UE mobility control continues. If CoMP is employed by the neighbour eNB then the procedure moves to step 730 in which the source eNB configures the UE to perform the CSI-RS measurements relevant for the neighbour cell and to include such results in a measurement report the UE may trigger for handover purposes, or in other types of measurement reports. The source eNB may have previously received a configuration message from the target eNB indicating to the source eNB that it should make use of the procedures in FIGS. 5 and 6 during the handover process. The message can include a list of L3 CSI-RS resources for which the target eNB would like to receive measurement data during the handover preparation.

The target eNB can provide, for one or more carrier frequencies, all parameters required by the neighbouring source eNB to configure L3 measurements for the concerned CSI-RS resources. The parameters can be, for example, the scrambling identity, or the CSI-RS resource configuration. It will of course be understood that that this provision of parameters from a target eNB to a source eNB does not occur at the time of handover, or when it is imminent, but somewhat before this time, for instance when a UE is approaching the area in which a target eNB is broadcasting.

The target eNB can also indicate which area each of the indicated L3 CSI-RS resources is relevant. This may be done by indicating for which target cell or source cell or combination of source and target cell specific CSI-RS resources are relevant.

During the final stages of the handover process, in accordance with certain embodiments of the present invention the target eNB sends a handover command to the source eNB in the form of a handover request acknowledgement, and the source eNB forwards the handover command to the UE.

Referring to FIG. 8, there is illustrated a general procedure for configuring a UE for CSI-RS measurement reporting during handover in accordance with an embodiment of the present invention.

In step 810, the handover has been initiated by the source eNB, and the target eNB receives the handover request from the source eNB. This handover preparation message includes all the handover information referred to in the above description of step 4 of FIG. 4. However, the message also includes additional CSI-RS measurement data which helps the target eNB decide whether to employ CoMP with the UE immediately after handover.

In step 820, the target eNB decides whether or not to employ CoMP and thus whether the UE should be configured with CoMP. If CoMP is not employed then the UE is not configured with CoMP, and the handover command is initiated from the target eNB to the source eNB in the normal way in step 840 as described above in connection with FIG. 4. However, if the UE is to be configured with CoMP, then the procedure moves to step 830.

In step 830 the target eNB specifies which L1 CSI-RS resources are included in the configuration message of the handover command. Regardless whether or not the target eNB configures L1 CSI-RS resources, the target may configure L3 CSI-RS resources.

Once the relevant CSI-RS resources have been configured, the procedure moves to step 840 where the handover command (with the configuration information including L1 and/or L3 CSI-RS resource configurations) is sent to the source eNB which forwards it on to the UE.

Referring now to FIG. 9, this further illustrates how certain embodiments of the present invention facilitate the immediate initiation of CoMP upon handover in an LTE network. The additional reporting, decision making and configurations associated with the CSI-RS resources in CoMP are illustrated in FIG. 9 in the form of a basic message sequence for the case of a handover of a UE from a source to a target eNB.

In step 901, the target eNB indicates for which CSI-RS resources it would like to receive measurement information during handover preparation to the source eNB over the X2 interface (although as discussed above, the present invention is equally applicable across the S1 interface). For each frequency (if multiple frequencies are involved), the target eNB provides all configuration information the neighbour requires to be able to configure the L3 reporting set of CSI-RS measurements. Compared to the procedure of FIG. 4, this additional messaging can be achieved by extensions to the X2 setup and/or the X2 configuration update messages and procedures. Step 902 is an acknowledgement from the source eNB.

In step 903, the source eNB configures the mobile to perform additional CSI-RS measurement reporting by sending a configuration message, which includes: regular measurement reporting for the purpose of UE mobility; L3 CSI-RS measurement reporting, to make sure the UE has the requested CSI-RS measurements available when initiating measurement reporting aimed to trigger handover; and the source eNB configures the UE to include available CSI-RS measurement when initiating a measurement report for the purpose of handover.

In step 904, the UE can initiate a measurement report to report good CSI-RS resources. This makes it possible for the source to include CSI-RS information even in case of a blind handover (when handover is not triggered by a measurement report, but for other reasons such as congestion).

In step 905, the UE initiates a measurement report that the network has configured for the purposes of handover or for mobility control. The UE includes the additional CSI-RS measurements in the report.

In step 906, the source eNB initiates handover preparation. The source eNB includes additional measurement information (either information collected before handover, or information included in the measurement report that triggered the handover).

In step 907, the target eNB generates the RRC connection reconfiguration message. The target eNB configures L1 CSI-RS reporting based on the information received in the handover preparation information.

While embodiments of the present invention described above relate specifically to 3GPP compliant LTE mobile communication systems, and refer to particular 3GPP Technical Specifications, similar constraints may arise in other mobile communication systems.

To summarise the above discussion, certain embodiments of the present address two broad issues present within conventional LTE networks which hitherto have prevented the activation of CoMP upon handover of a UE.

The first issue concerns how to provide a target eNB with up to date CSI-RS measurement results. As discussed above, certain embodiments of the present invention address this issued by introducing an option for a UE to provide available CSI-RS measurement results to a source eNB when handover is imminent. The source eNB can subsequently forward the up to date CSI-RS measurement results to the target eNB when initiating handover preparation. The first issue can be expressed more generally as how can a source eNB obtain additional measurement information that is up to date, to be provided to a target eNB upon handover.

The second issue concerns how the source eNB knows which CSI-RS resources are relevant to the target eNB after handover. The source eNB needs to know this, so it can make sure that the UE is configured to provide CSI-RS measurement results for these resources when handover is imminent.

Considering the first issue, as discussed above in accordance with a first embodiment of the present invention there is introduced the option for the UE to additionally report available measurement results to the source eNB when handover is imminent. The source eNB may then selectively or completely forward the measurement results to the target eNB when initiating handover preparation. Advantageously, the target eNB receives the most up to date CSI-RS measurement results available to the source eNB. As handover is typically triggered by a measurement report message that is send by a UE, advantageously CSI-RS measurement results available to the UE may be additionally reported in this message, which means that the most up to date results are available to be forward to the target eNB. However, the source eNB may also forward CSI-RS measurement results that are stored at the source eNB, which may have been additionally reported or may have been reported in a CSI-RS measurement report.

In accordance with the first embodiment of the invention the UE includes additional measurement results in a measurement report that according to current state of the art would not include those results. That is, available measurement results are additionally reported. These additionally reported measurement results may be available CSI-RS or CRS measurement results that would normally be included in that measurement report. The measurement results that are normally included are those results that are mandatory for that type of report, or indicated by a report trigger criterion. The additionally reported measurement results may relate to the same frequency as a result which is included in response to a trigger criterion (and comprise a different type of measurement) or they may relate to different frequencies. The additionally reported measurement results may be distinguished in some other way, though the principle element is that they are not necessary for the purposes of the measurement report which the UE is arranged to generate and transmit.

The first embodiment of the present invention may comprise the additional reporting of available CSI-RS measurement results in a measurement report that would normally not include those measurement results. According to the current state of the art a measurement report for a CRS based measurement, does not include any CSI-RS measurement results. In accordance with the first embodiment of the invention the UE can include available CSI-RS measurement results to a measurement report for a CRS based measurement trigger. Alternatively, according to the current state of the art a measurement report for a CSI-RS based measurement trigger, does not include any CSI-RS measurement results concerning other frequencies than the specific frequency for which the report was triggered. In accordance with the first embodiment of the invention the UE can include available CSI-RS based measurement results concerning other frequencies than the one for which the CSI-RS based measurement report was triggered. In particular, while currently handover is triggered in response to a CRS measurement report (other than for blind handover) it is possible that in future handover could also be triggered by a CSI-RS measurement report. The first embodiment allows the additional reporting of further CSI-RS measurement results in such a scenario.

The first embodiment of the present invention may additionally or alternatively comprise the additional reporting CRS measurements results in a measurement report that would normally not include those measurement results. Specifically, the first embodiment of the present invention allows the UE to additionally report available CRS measurement results in a measurement report triggered by a CSI-RS based measurement that would normally not include these measurement results.

As a further alternative, the first embodiment of the present invention allows the UE to additionally report both CRS and CSI-RS measurement results in a measurement report that would not normally include those measurement results.

In some circumstances the first embodiment of the present invention allows the number of additional measurement results the UE includes in a measurement report to be limited. The skilled person will appreciate that there are a large number of options for limiting the measurement results that are additionally included, and these options may be configured freely by the network operator (if they are not fixed by the LTE standards). It is anticipated that the options for restricting the additional measurement reports may ultimately be defined by amendment to the LTE standards defining the affected measurement reports. By way of example, the options may include introducing limits with respect to:

a) the measurement reports for which the UE is allowed to include additional measurements results;

b) the frequencies for which the UE should include additional measurement results, including i) the frequency for which the measurement report is triggered, ii) a list of specific frequencies, iii) any frequency for which the additional measurement results are available, iv) any frequency, other than the one for which the report is triggered, for which the additional measurement results are available;

c) a limit on the number of measurement results, for instance, the UE only includes measurement results for the best CSI-RS resources/the best cells up to this limit; and d) a threshold such that the UE only includes measurement results exceeding the value indicated by the threshold (and the threshold may either be fixed or relative, for example a non-best result is only included if the difference compared to the best is less than the threshold).

As discussed in detail above, for the first embodiment of the present invention in which the UE can additionally report available measurement results, this may be extended in accordance with certain embodiments to define a configuration mechanism. As discussed above, in the case of configuring the additional reporting of CSI-RS measurement results, the configuration mechanism may be via modifications to the L3 reporting set procedure, and may be in response to a list of CSI-RS resources provided by a potential target eNB for which that eNB would like to receive measurement information. Based on the measurement information provided to that eNB at the time of handover, that eNB is able to determine which L1 feedback set is most optimal and should be included in a reconfiguration message sent to the UE as part of the handover process (which is a reconfiguration message including a field mobilityControlInfo.

Configuration signalling transmitted from the source eNB to the UE may include an indication whether or not the UE shall include the additional measurement results (on/off). There may either be one indication applicable to all measurements or (more likely) an indication per measurement. In the first case the parameters may be provided at the top level of the measurement configuration (measConfig), in the second case the parameters are provided as part of the reporting configuration. Additionally, or alternatively, the configuration signalling may include an indication of the frequencies for which the UE should include the additional measurement results, including according to the options for limiting the frequencies noted above. Additionally, or alternatively, the configuration signalling may include an indication of the maximum number of measurement results (that is, the UE shall only include measurement results for the best CSI-RS resources/the best cell up to this limit). Additionally, or alternatively, the configuration signalling may include an indication of a minimum strength/quality level (a threshold: that is the UE only includes measurement results exceeding the threshold). The threshold may either be fixed or relative as indicated in the previous discussion.

Additionally, the UE may include additional CSI-RS measurement results per frequency in a measurement report. The reporting for serving frequencies may be separate from the reporting for non-serving frequencies.

For conventional LTE networks, it is only possible for CSI-RS measurements to be configured for a serving frequency. However, a target eNB might however wish to employ CoMP on a frequency that is not used by the source eNB. In accordance with the additional reporting of the first embodiment of the invention, this limitation is removed to allow a L3 reporting set to be configured for non-serving frequencies.

In accordance with a second embodiment of the invention, as discussed above CSI-RS measurements additionally reported by the UE or otherwise available to the source eNB can be transmitted from the source eNB to the target eNB during handover preparation. The source eNB may forward L3 CSI-RS measurement information stored when previously receiving a measurement report (for instance, a measurement report specifically for the purpose of managing the source eNB L1 feedback set). Alternatively, the source eNB may forward CSI-RS measurement information additionally included by the UE in a measurement report that triggered the handover. The source eNB may indicate to the target eNB whether the forwarded information was freshly received from the UE (just before it initiated handover) or whether it is a stored result. Stored results are the only available information in the event of blind handover.

Furthermore, in accordance with the second embodiment of the invention, the source eNB may forward the L3 CSI-RS measurement information either by including it in the UE context or by including it in the RRM configuration when initiating handover.

Turning now to the second issue (how the source eNB knows which CSI-RS resources are relevant only after handover); the source eNB needs know this information, to ensure that the UE has CSI-RS measurements available for these resources when handover is imminent. In accordance with a third embodiment of the present invention, an eNB may indicate to its neighbours the L3 CSI-RS resources for which it wishes to receive measurement during the handover preparation. Specifically, an eNB may provide, for one or more carrier frequencies, all parameters for which is requires a neighbouring eNB to configure L3 reporting set measurements for the concerned CSI-RS resources (for instance, scrambling identity and resource configuration). An eNB may also indicate in which area each of the indicated L3 CSI-RS resources is relevant. This may be done by indicating for which source cell specific CSI-RS resources are relevant.

Specifically, in the case that the UE is arranged to additionally report one or more CSI-RS measurement results in a CSI-RS or CRS measurement report, the or each specific CSI-RS resource that is to be additionally reported may be specified by the target eNB. This specified CSI-RS resource may be communicated to the source eNB by the target eNB and onwards to the UE in a configuration message. Of course, at the time the target eNB sends the identification of one or more CSI-RS resources, it is not identified as a target eNB and has provided this information to one or more neighbouring eNBs.

Apart from the RRM measurements defined in connected mode, the E-UTRA specifications include mechanisms by which the UE stores measurement results either upon specific events (radio link failure, handover failure, connection establishment failure) or periodically (for instance measurement logging in idle mode). Moreover, the RRM measurement procedures by which the UE can be requested to report the strongest cells it detects on a frequency as well as to report specific information about a detected cell. The specific information may be information broadcast by the cell such as cell identity, tracking area, PLMN identities, or CSG information. These procedures have been introduced to facilitate the initial configuration of the network (ANR), as well as for the further optimisation and monitoring of the network without the need to do manual test drives (SON, MDT). MDT is concerned with coverage maps, finding coverage holes, finding problematic hot-spots.

In accordance with a fourth embodiment of the present invention, in order to provide additional information of value to the network, the above mentioned measurements may be extended to include L3 CSI-RS measurement information. Specifically, in accordance with the fourth embodiment of the invention a UE may be arranged to perform L3 CSI-RS measurements at the time of detecting a radio link failure, a handover failure or a connection establishment failure reports. Additionally, or alternatively, the UE may be arranged to include L3 CSI-RS measurement information in logged measurements collected during idle mode. Additionally, or alternatively, the UE may be arranged to report information regarding L3 CSI-RS resources autonomously detected by the UE. This reporting may be in response to a request from E-UTRAN.

The process of configuring a UE to additionally report measurement results will now be described, with reference as one example to the use of particular messages within an LTE network.

Firstly, the E-UTRAN sends a configuration message to the UE. In particular, this may be an RRCConnectionReconfiguration message including the field measConfig. This standard LTE message may be modified in accordance with certain embodiments of the present invention depending upon the required configuration options, which may include any or all of the following: an on/off indicator, either general for all measurements (within the measConfig field) or per measurement (within a reportConfig field); an indication of which type of additional measurement results to report (CSI-RS and/or CRS measurement results); an indication of for which frequencies to provide the additional results (same as the linked object, all, specifically listed frequencies); and/or a limit regarding number of reports and/or regarding a minimum signal level to provide an additional result.

The UE returns an RRCConnectionReconfigurationComplete message, which may be unmodified.

When a reporting condition is met the UE sends a modified MeasurementReport message. If additional reporting is configured for the concerned measurement, the UE includes the additional measurement results. The information the UE additionally includes depends on the configuration: for instance additional CSI-RS and/or CRS measurement results, with the results possibly limited to specific frequencies, and possibly in number or regarding signal level.

It will be appreciated that embodiments of the present invention can be realized in the form of hardware, software or a combination of hardware and software. Any such software may be stored in the form of volatile or non-volatile storage, for example, a storage device like a ROM, whether erasable or rewritable or not, or in the form of memory, for example, RAM, memory chips, device or integrated circuits or on an optically or magnetically readable medium, for example, a CD, DVD, magnetic disk or magnetic tape or the like. It will be appreciated that the storage devices and storage media are embodiments of machine-readable storage that are suitable for storing a program or programs comprising instructions that, when executed, implement embodiments of the present invention. Accordingly, embodiments provide a program comprising code for implementing apparatus or a method as claimed in any one of the claims of this specification and a machine-readable storage storing such a program. Still further, such programs may be conveyed electronically via any medium including a communication signal carried over a wired or wireless connection and embodiments suitably encompass the same.

Throughout the description and claims of this specification, the words "comprise" and "contain" and variations of them mean "including but not limited to", and they are not intended to (and do not) exclude other components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers or characteristics described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed. It will be also be appreciated that, throughout the description and claims of this specification, language in the general form of "X for Y" (where Y is some action, activity or step and X is some means for carrying out that action, activity or step) encompasses means X adapted or arranged specifically, but not exclusively, to do Y.

The reader's attention is directed to all papers and documents which are filed concurrently with or previous to this specification in connection with this application and which are open to public inspection with this specification, and the contents of all such papers and documents are incorporated herein by reference.

The above embodiments are to be understood as illustrative examples of the invention. Further embodiments of the invention are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. A method to operate a source base station in a Long Term Evolution (LTE) compliant mobile wireless communications network, the network comprising a target base station and a mobile terminal, the method comprising:
   receiving, by a transceiver in the source base station, a measurement report including one or more channel state information reference signal (CSI-RS) measurement results from the mobile terminal;
   determining, by one more processors in the source base station, whether to handover the mobile terminal to the target base station in response to the measurement report; and
   sending, by the transceiver in the source base station, a handover request message to the target base station, when a handover to the target base station is determined,
   wherein the handover request message includes the one or more CSI-RS measurement results received from the mobile terminal for initiating coordinated multi-point transmission (CoMP).

2. The method according to claim 1, further comprising:
   sending, by the transceiver in the source base station, a configuration message to the mobile terminal indicating a set of measurement results to additionally report in measurement reports.

3. The method according to claim 2, wherein the configuration message includes:
   an indication whether to include an additional reported measurement result within all measurement reports of the mobile terminal or specified types of measurement reports of the mobile terminal; or
   an indication for measurement reports whether to include an additional reported measurement result of the mobile terminal.

4. The method according to claim 2, wherein the configuration message indicates that additionally reported measurement results relate to at least one of:
   a frequency indicated by an associated measurement object;
   a frequency which is not a frequency indicated by an associated measurement object;
   a predetermined list of frequencies; and
   all frequencies for which measurement results are available.

5. The method according to claim 2, wherein the configuration message indicates a predetermined maximum number of additionally reported measurement results or a threshold of measurement results to be additionally reported.

6. The method according to claim 1, further comprising:
   sending, by the transceiver in the source base station, a configuration message to the mobile terminal indicating a set of CSI_RS resources to be reported and which are supplied to the source base station by the target base station.

7. The method according to claim 1, wherein determining whether to handover the mobile terminal to the target base station comprises:
   receiving, by the transceiver in the source base station, a latest measurement report from the mobile terminal; and
   determining, by one or more processors in the source base station, whether to handover the mobile terminal to the target base station based on the latest measurement report, wherein the handover request message includes one or more CSI-RS measurement results received from the mobile terminal in the latest measurement report.

8. The method according to claim 1, wherein the handover request message includes one or more CSI-RS measurement results received from the mobile terminal in a previous measurement report.

9. The method according to claim 1, wherein the handover request message includes one or more CSI-RS measurement results either within a mobile terminal context field or within an RRM configuration field.

10. A method to operate a target base station in a Long Term Evolution (LTE) compliant mobile wireless communications network, the network comprising a source base station and a mobile terminal, the method comprising:
   receiving, by a transceiver in the target base station, a handover request message from the source base station, when a handover from the source base station to the target base station is determined by the source base station; and initiating, by one more processors in the target base station, coordinated multi-point transmission (CoMP) based on the handover request message, wherein the handover request message includes one or more CSI-RS measurement results received from the mobile terminal.

11. A method to operate a mobile terminal in a Long Term Evolution (LTE) compliant mobile wireless communications network, the network comprising a source base station and a target base station, the method comprising:

generating, by one more processors in the mobile terminal, a measurement report including one or more channel state information reference signal (CSI-RS) measurement results; and sending, by a transceiver in the mobile terminal, the measurement report including the one or more CSI-RS measurement results to the source base station, wherein a handover request message is sent to the target base station from the source base station, when a handover to the target base station is determined in response to the measurement report, and wherein the handover request message includes the one or more CSI-RS measurement results for initiating coordinated multi-point transmission (CoMP).

12. The method according to claim 11, further comprising:

receiving, by the transceiver in the mobile terminal, a configuration message from the source base station indicating a set of measurement results to additionally report in measurement reports; and generating, by one more processors in the mobile terminal, the measurement report in response to a trigger, wherein the configuration message indicates a predetermined maximum number of additionally reported measurement results or a threshold of measurement results to be additionally reported, and wherein the generated measurement report includes:
one or more cell specific reference symbols (CRS) measurement results or one or more CSI-RS measurement results indicated by a trigger criterion, and
one or more additionally reported CSI-RS measurement results or one or more additionally reported CRS measurement results.

13. The method according to claim 12, wherein each additionally reported measurement result relates to a different type of measurement result of a frequency where the measurement report includes a measurement result indicated by a trigger criterion or to a measurement result for a frequency where the measurement report does not include a measurement result indicated by a trigger criterion.

14. The method according to claim 12, wherein generating the measurement report in response to the trigger comprises at least one of:

generating, by one more processors in the mobile terminal, a measurement report including one or more CRS measurement results indicated by a trigger criterion and one or more additionally reported CSI-RS measurement results;

generating, by one more processors in the mobile terminal, a measurement report including one or more CSI-RS measurement results indicated by a trigger criterion and one or more additionally reported further CSI-RS measurement results;

generating, by one more processors in the mobile terminal, a measurement report including one or more CSI-RS measurement results indicated by a trigger criterion and one or more additionally reported CRS measurement results; or generating, by one more processors in the mobile terminal, a measurement report including one or more CSI-RS measurement results indicated by a trigger criterion, one or more additionally reported further CSI-RS measurement results, and one or more additionally reported CRS measurement results.

15. A source base station in a Long Term Evolution, LTE, compliant mobile wireless communications network, the network comprising a target base station and a mobile terminal, wherein the source base station is configured to:
receive, by a transceiver, a measurement report including one or more channel state information reference signal (CSI-RS) measurement results from the mobile terminal;
determine, by a processor, whether to handover the mobile terminal to the target base station in response to the measurement report; and
send, by the transceiver, a handover request message to the target base station, when a handover to the target base station is determined,
wherein the handover request message includes the one or more CSI-RS measurement results received from the mobile terminal for initiating coordinated multi-point transmission (CoMP).

16. The source base station according to claim 15, further configured to:
send, by the transceiver, a configuration message to the mobile terminal indicating a set of measurement results to additionally report in measurement reports.

17. The source base station according to claim 16, wherein the configuration message indicates a predetermined maximum number of additionally reported measurement results or a threshold of measurement results to be additionally reported.

18. A target base station in a Long Term Evolution (LTE) compliant mobile wireless communications network, the network comprising a source base station and a mobile terminal, wherein:

the target base station is configured to:
receive, by a transceiver, a handover request message from the source base station, when a handover from the source base station to the target base station is determined by the source base station; and
initiate, by a processor, coordinated multi-point transmission (CoMP) based on the handover request message,
wherein the handover request message includes one or more CSI-RS measurement results received from the mobile terminal.

19. A mobile terminal in a Long Term Evolution (LTE) compliant mobile wireless communications network, the network comprising a source base station and a target base station, wherein:

the mobile terminal configured to:
generate, by a processor, a measurement report including one or more channel state information reference signal (CSI-RS) measurement results; and
send, by a transceiver, the measurement report including the one or more CSI-RS measurement results to the source base station, wherein a handover request message is sent to the target base station from the source base station, when a handover to the target base station is determined in response to the measurement report, and wherein the handover request message includes the one or more CSI-RS measurement results for initiating coordinated multi-point transmission (CoMP).

20. The mobile terminal according to claim 19, further configured to:

receive, by the transceiver, a configuration message from the source base station indicating a set of measurement results to additionally report in measurement reports; and generate, by the processor, the measurement report in response to a trigger, wherein the configuration message indicates a predetermined maximum number of additionally reported measurement results or a threshold of measurement results to be additionally reported, and wherein the generated measurement report includes:
one or more cell specific reference symbols (CRS) measurement results or one or more CSI-RS measurement results indicated by a trigger criterion, and
one or more additionally reported CSI-RS measurement results or one or more additionally reported CRS measurement results.

* * * * *